United States Patent [19]

Itoh et al.

[11] Patent Number: 5,446,142
[45] Date of Patent: Aug. 29, 1995

[54] PHTHALOCYANINE AND NAPHTHALOCYANINE LIGHT-ABSORBING COMPOUND AND OPTICAL RECORDING MEDIUM CONTAINING SAME

[75] Inventors: Hisato Itoh; Takahisa Oguchi; Kenichi Sugimoto; Ryu Oi; Hideki Umehara; Shin Aihara, all of Yokohama, Japan

[73] Assignees: Mitsui Toatsu Chemicals, Inc., Tokyo; Yamamoto Chemicals, Inc., Yao, both of Japan

[21] Appl. No.: 74,537

[22] Filed: Jun. 11, 1993

[30] Foreign Application Priority Data

Jun. 12, 1992 [JP] Japan .................. 4-153718
Jan. 29, 1993 [JP] Japan .................. 5-013507

[51] Int. Cl.$^6$ .............. C09B 47/04; C09K 19/58
[52] U.S. Cl. .................. 540/139; 540/122; 252/299.2
[58] Field of Search .......... 540/122, 139, 140; 252/299.1; 430/495

[56] References Cited

U.S. PATENT DOCUMENTS 5,220,010 6/1993 Oguchi et al. .................. 540/142

FOREIGN PATENT DOCUMENTS

| | | |
|---|---|---|
| 0179436 | 4/1986 | European Pat. Off. |
| 0192215 | 8/1986 | European Pat. Off. |
| 0212907 | 3/1987 | European Pat. Off. |
| 0358774 | 3/1990 | European Pat. Off. |
| 0424777 | 5/1991 | European Pat. Off. |
| 0463550 | 1/1992 | European Pat. Off. |
| 3510361 | 10/1985 | Germany. |
| 4027173 | 7/1991 | Germany. |
| 0213923 | 11/1987 | Japan. |

OTHER PUBLICATIONS

Patent Abstracts of Japan, vol. 11, No. 247 (M-615) (2694), Aug. 12, 1987, JP-A-62 056 194, Mar. 11, 1987.
Database WPI, Derwent Publications Ltd., AN 90-088415 (12), JP-A-2 043 091, Feb. 13, 1990.
Database WPI, Derwent Publications Ltd., AN 88 088194 (13), JP-A-63 039 388, Feb. 19, 1988.

*Primary Examiner*—Mukund J. Shah
*Assistant Examiner*—Pavanaram K. Sripada
*Attorney, Agent, or Firm*—Oblon, Spivak, McClelland, Maier & Neustadt

[57] ABSTRACT

The present invention provides a light-absorbing compound represented by the formula (I):

$$\text{Dye-}(OR^1)(OR^2)(OR^3)\ldots(OR^n) \quad (I)$$

wherein Dye is a light-absorbing compound residue having at least one aromatic ring; $OR^1$ to $OR^n$ are substituents on the aromatic ring, and are independently (a) substituted or unsubstituted saturated hydrocarbonoxy groups having 1 to 20 carbon atoms, or (b) substituted or unsubstituted unsaturated hydrocarbonoxy groups having 2 to 20 carbon atoms, and at least one of $OR^1$ to $OR^n$ is an unsaturated hydrocarbonoxy group; and n is a value of from 1 to 10. The present invention also provides an optical recording medium containing the above-mentioned light-absorbing compound in a recording layer.

22 Claims, No Drawings

PHTHALOCYANINE AND NAPHTHALOCYANINE LIGHT-ABSORBING COMPOUND AND OPTICAL RECORDING MEDIUM CONTAINING SAME

BACKGROUND OF THE INVENTION (i) Field of the Invention

The present invention relates to a compound useful as a light-absorbing agent which can play an important role in optoelectronics fields of information recording, display sensors and protective spectacles, and it also relates to an optical recording medium such as an optical disc or optical card in which the above-mentioned compound is contained in a recording layer.

(ii) Description of the Related Art

Semiconductor laser beams are utilized for writing and reading of data in and from devices such as optical discs and optical cards. Particularly, as a recording system of optical recording media which are used in these devices, heat mode recording (thermal recording) which involves light/heat exchange is usually employed at a practical level. Therefore, as materials for a recording layer, there have been suggested low-melting metals, organic polymers, and organic dyestuffs which give rise to a physical change or chemical change such as melting, evaporation, decomposition or sublimation. Above all, the organic dyestuffs having a low melting point or decomposition temperature are preferable in point of recording sensitivity, and therefore cyanine dyestuffs, phthalocyanine dyestuffs, naphthalocyanine dyestuffs and azo dyestuffs have mainly been developed as the materials of the recording layer.

For example, in Japanese Patent Application Laid-open No. 147286/1990, an optical recording medium in which a cyanine dyestuff is contained in the recording layer has been suggested. However, this type of medium is poor in long-term shelf stability and light resistance, and recording properties are also insufficient.

Optical recording media containing an anthraquinone dyestuff (e.g., Japanese Patent Application Laid-open No. 224448/1983) and a naphthoquinone dyestuff (e.g., Japanese Patent Application Laid-open No. 224793/1983) in recording layers have also been suggested. However, they are poor in long-term shelf stability and light resistance, and recording properties are also insufficient, as in the cyanine dyestuffs.

In Japanese Patent Application Laid-open Nos. 25886/1986, 43269/1990 (U.S. Pat. No. 4,960,538) and 296885/1990, optical recording media containing naphthalocyanine dye-stuffs in recording layers have been suggested. These media are excellent in light resistance, but reflectance and recording properties of the recording layers are insufficient.

Furthermore, techniques for utilizing phthalocyanine dyestuffs, particularly alkoxy-substituted phthalocyanines in recording layers of optical recording media are well known as disclosed in Japanese Patent Application Laid-open Nos. 154888/1986 (EP 186404), 197280/1986, 246091/1986, 39286/1987 (U.S. Pat. No.4,769,307), 37991/1988 and 39388/1988. It cannot be considered that the optical recording media using the phthalocyanine dyestuffs which are disclosed in these patents have satisfactory sensitivity and recording properties. The improvement of these media has been suggested in Japanese Patent Application Laid-open No. 62878/1991 (U.S. Pat. No. 5,124,067), but even said advanced media disclosed therein have still insufficient recording property for making an especially high-speed and high-density recording.

There have been suggested applications, to optical recording media, of alkoxy-substituted phthalocyanines in Japanese Patent Application Laid-open Nos. 43269/1990 (U.S. Pat. No. 4,960,538) and 296885/1990, aliphatic hydrocarbonoxy-substituted phthalocyanines in Japanese Patent Application Laid-open No. 37991/1988, and alkenylthio-substituted phthalocyanines in Japanese Patent Application Laid-open No. 39388/1988. However, in "Detailed Description of the Invention" and "Examples" of these inventions, neither an unsaturated hydrocarbon-oxy nor -thio group containing a double bond is described. Needless to say, it is not described anywhere that the unsaturated hydrocarbonoxy group containing a triple bond or double bond between carbons is effective for sensitivity and recording properties of the optical recording medium.

Among the optical recording media in which other known dyestuffs are used, the media which are sufficiently excellent in performance such as recording properties have not been found so far.

In writing and reading data in and from the optical recording media, a laser beam of 400-900 nm is utilized, and therefore it is important to control an absorption coefficient, a refractive index and the like of the recording material in the vicinity of the oscillation wavelength of the used laser beam, and it is also important to form precise pits in writing and reading. They are particularly important for high-speed recording and high-density recording which are desired in recent years. For the reason, it is necessary to develop a dyestuff for the optical recording media having a high structure stability, a high refractive index to light in the vicinity of oscillation wavelength of the laser beam, good decomposition properties and high sensitivity. However, the conventionally developed dyestuffs for the optical recording media have problems that they are poor in sensitivity (a C/N ratio and an optimum recording power) and recording properties (jitter and deviation) particularly at the times of high-speed recording and high-density recording.

SUMMARY OF THE INVENTION

An object of the present invention is to provide dyestuffs capable of overcoming the above drawbacks and capable of giving an optical recording medium having high sensitivity and excellent recording properties even when making a high-speed recording and high-density recording.

Another object of the present invention is to provide optical recording media using these dyestuffs and having high sensitivity and excellent recording properties.

The present inventors have intensively investigated to solve the above-mentioned problems, and as a result, they have found novel light-absorbing compounds suitable for the above-mentioned objects. In consequence, the present invention has now been completed.

That is, a first aspect of the present invention is directed to a light-absorbing compound represented by the formula (I):

$$\text{Dye-}(OR^1)(OR^2)(OR^3)\ldots(OR^n) \qquad (I)$$

wherein Dye is a light-absorbing compound residue of a dithiol metal complex, phthalocyanine, naphthalocyanine, naphthoquinone, anthraquinone, cyanine, merocyanine, oxonol, triphenylmethane, diphenylmethane, squarylium, pyrylium, xanthene, oxazine, azo, indigo, indoaniline, indophenol, styryl, spiropyran, fluoran or azulene series, and the light-absorbing compound residue has at least one aromatic ring therein; $OR^1$ to $OR^n$ are substituents on the aromatic ring in Dye, and they are independently (a) substituted or unsubstituted saturated hydrocarbonoxy groups having 1 to 20 carbon atoms, or (b) substituted or unsubstituted unsaturated hydrocarbonoxy groups having 2 to 20 carbon atoms, and at least one of $OR^1$ to $OR^n$ is an unsaturated hydrocarbonoxy group; and n is a value of from 1 to 10, and a second aspect of the present invention is directed to an optical recording medium in which the light-absorbing compound is contained in a recording medium.

In particular, it is preferable that, in the formula (I), each of from $OR^1$ to $OR^n$ is a branched saturated or unsaturated hydrocarbonoxy group, and that each of from $OR^1$ to $OR^n$ is the unsaturated hydrocarbonoxy group and it has one or more double bonds, and at least one double bond is present between the second and third carbon atoms from the carbon atom adjacent to the oxygen atom bonded to the Dye aromatic ring.

The light-absorbing compound of the present invention into which the unsaturated hydrocarbonoxy group is introduced exerts remarkable effects as a compound for forming the recording layer of the optical recording medium which has high sensitivity and excellent recording properties not only at the time of usual recording but also at the times of high-speed recording and high-density recording. Specifically, the introduction of the double bond into a specific position of hydrocarbonoxy group makes a further excellent optical recording medium with superior sensitivity and recording properties at a low laser power.

DETAILED DESCRIPTION OF THE INVENTION

One example of particularly effective light-absorbing compounds can be represented by the formula (II):

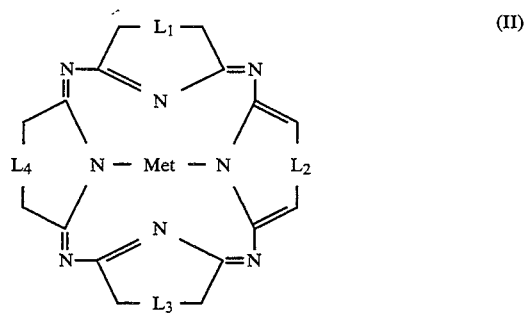

wherein each of $L_1$, $L_2$, $L_3$ and $L_4$ is a benzene ring or naphthalene ring skeleton having 0 to 2 independent OR groups, and at least one of $L_1$, $L_2$, $L_3$ and $L_4$ has one or more OR substituents, and the OR substituent is (a) a substituted or unsubstituted saturated hydrocarbon-oxy group having 1 to 20 carbon atoms, or (b) a substituted or unsubstituted unsaturated hydrocarbon-oxy group having 2 to 20 carbon atoms, but at least one of all the OR substituents present on $L_1$, $L_2$, $L_3$ and $L_4$ is an unsaturated hydrocarbonoxy group; Met is two hydrogen atoms, a divalent metal atom, a trivalent mono-substituted metal atom, a trivalent di-substituted metal atom or an oxymetal group.

In particular, it is preferable that, in the formula (II), each OR substituent present on $L_1$, $L_2$, $L_3$ and $L_4$ is a branched saturated or unsaturated hydrocarbonoxy group, and that each OR substituent present on $L_1$, $L_2$, $L_3$ and $L_4$ is the unsaturated hydrocarbonoxy group and it has one or more double bonds, and at least one double bond is present between the second and third carbon atoms from the carbon atom adjacent to the oxygen atom bonded to the aromatic ring.

Preferable examples of the compound represented by the formula (II) include compounds represented by the following formula (III) to (V).

A naphthalocyanine compound represented by the formula (III):

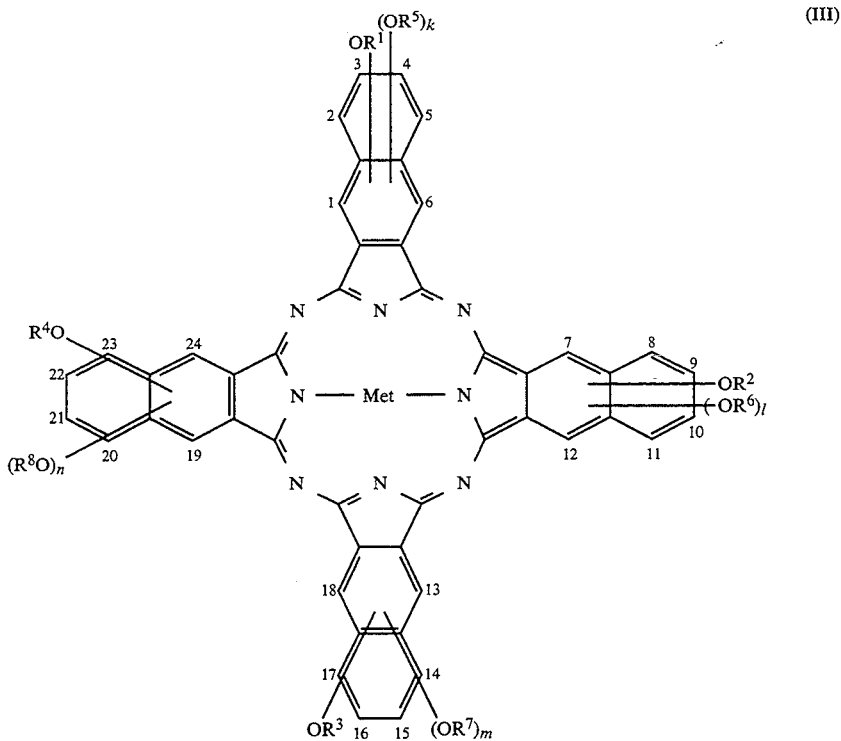
(III)

wherein each of $R^1$, $R^2$, $R^3$, $R^4$, $R^5$, $R^6$, $R^7$ and $R^8$ is independently (a) a substituted or unsubstituted saturated hydrocarbon group having 1 to 20 carbon atoms, or (b) a substituted or unsubstituted unsaturated hydrocarbon group having 2 to 20 carbon atoms, but at least one of $R^1$, $R^2$, $R^3$ and $R^4$ is an unsaturated hydrocarbon group; each of k, l, m and n is the number of OR and it is 0 or 1; and Met is two hydrogen atoms, a divalent metal atom, a trivalent mono-substituted metal atom, a tetravalent di-substituted metal atom or an oxymetal group.

In particular, it is preferable that, in the formula (III), each of $R^1$, $R^2$, $R^3$, $R^4$, $R^5$, $R^6$, $R^7$ and $R^8$ is a branched saturated or unsaturated hydrocarbon group, and substituting positions of $OR^1$, $OR^2$, $OR^3$ and $OR^4$ are α-positions of 1 or 6, 7 or 12, 13 or 18 and 19 or 24, respectively, and that at least one of $R^1$, $R^2$, $R^3$ and $R^4$ has one or more double bonds, and at least one double bond is present between the second and third carbon atoms from the carbon atom adjacent to the oxygen atom bonded to the naphthalene ring.

A naphthalocyanine compound represented by the formula (IV):

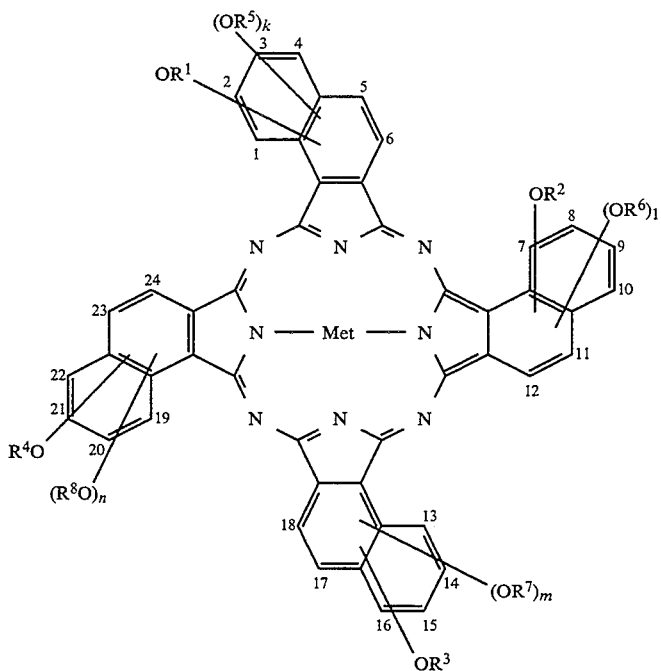

(IV)

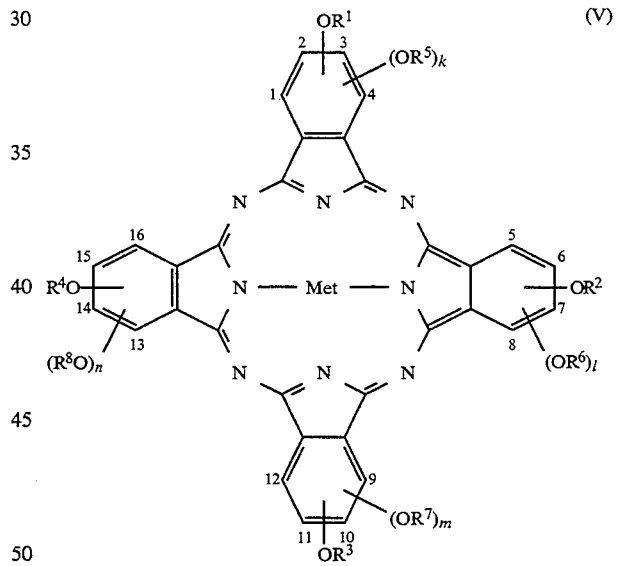

(V)

wherein each of $R^1$, $R^2$, $R^3$, $R^4$, $R^5$, $R^6$, $R^7$ and $R^8$ is independently (a) a substituted or unsubstituted saturated hydrocarbon group having 1 to 20 carbon atoms, or (b) a substituted or unsubstituted unsaturated hydrocarbon group having 2 to 20 carbon atoms, but at least one of $R^1$, $R^2$, $R^3$ and $R^4$ is an unsaturated hydrocarbon group; each of k, l, m and n is the number of OR and it is 0 or 1; and Met is two hydrogen atoms, a divalent metal atom, a trivalent mono-substituted metal atom, a tetravalent di-substituted metal atom or an oxymetal group.

In particular, it is preferable that, in the formula (IV), each of $R^1$, $R^2$, $R^3$, $R^4$, $R^5$, $R^6$, $R^7$ and $R^8$ is a branched saturated or unsaturated hydrocarbon group, and substituting positions of $OR^1$, $OR^2$, $OR^3$ and $OR^4$ are Q-positions of 6, 12, 18 and 24, respectively, and that at least one of $R^1$, $R^2$, $R^3$ and $R^4$ has one or more double bonds, and at least one double bond is present between the second and third carbon atoms from the carbon atom adjacent to the oxygen atom bonded to the naphthalene ring.

A phthalocyanine compound represented by the formula (V):

wherein each of $R^1$, $R^2$, $R^3$, $R^4$, $R^5$, $R^6$, $R^7$ and $R^8$ is independently (a) a substituted or unsubstituted saturated hydrocarbon group having 1 to 20 carbon atoms, or (b) a substituted or unsubstituted unsaturated hydrocarbon group having 2 to 20 carbon atoms, but at least one of $R^1$, $R^2$, $R^3$ and $R^4$ is an unsaturated hydrocarbon group; each of k, l, m and n is the number of OR and it is 0 or 1; and Met is two hydrogen atoms, a divalent metal atom, a trivalent monosubstituted metal atom, a tetravalent di-substituted metal atom or an oxymetal group.

In particular, it is preferable that, in the formula (V), each of $R^1$, $R^2$, $R^3$, $R^4$, $R^5$, $R^6$, $R^7$ and $R^8$ is a branched saturated or unsaturated hydrocarbon group, and substituting positions of $OR^1$, $OR^2$, $OR^3$, $OR^4$, $OR^5$, $OR^6$, $OR^7$ and $OR^8$ are α-positions of 1, 4, 5, 8, 9, 12, 13 and 16, respectively, and that at least one of $R^1$, $R^2$, $R^3$ and $R^4$ has one or more double bonds, and at least one double bond is present between the second and third carbon atoms from the carbon atom adjacent to the oxygen atom bonded to the benzene ring. Another example is a light-absorbing compound in which each of $R^1$, $R^2$, $R^3$ and $R^4$ is the unsaturated hydrocarbon group and has one or more double bonds, and at least one double bond is present between the second and third carbon atoms from the carbon atom adjacent to the oxygen atom bonded to the benzene ring, and each of k, l, m and n is 0, or in which each of $R^1$, $R^2$, $R^3$ and $R^4$ is the unsaturated hydrocarbon group having at least one double bond, and substituting positions of $OR^1$, $OR^2$, $OR^3$ and $OR^4$ are 1- or 4-position, 5- or 8-position, 9- or 12-position, and 13- or 16-position, respectively; and each of k, l, m and n is 0.

In the present invention, the double bond means a double bond between carbon atoms which is not on an aromatic ring.

In the formulae (I) to (V), examples of substituents of the saturated or unsaturated substituted hydrocarbon-oxy group include an alkyloxy group, aryloxy group, acyl group, hydroxyl group, amino group, alkylthio group, arylthio group and aryl group.

In the formulae (I) to (V), the unsaturated hydro-car-bon-oxy group or unsaturated hydrocarbon group contains 1 to 4 triple bonds and/or double bonds between carbon atoms which are unsaturated bonds, and the triple bond and double bond between carbon atoms may be together present. The light-absorbing compound represented by the formula (I) or (II) is a compound which can absorb light having a wavelength of 400–900 nm. Furthermore, the number of carbon atoms in the OR groups in the formulae (I) to (V) is from 2 to 20, preferably from 3 to 12, more preferably from 5 to 10, and half or more of all the OR groups, which the light-absorbing compound has, may have 3 to 12 carbon atoms or 5 to 10 carbon atoms.

The light-absorbing compound of the present invention in which the triple bond or the double bond between carbon atoms is present in the OR group can exert improvement effects of the sensitivity and recording properties of an optical recording medium not only in a usual recording process but also in a recording process in which a processing velocity is higher than in a conventional case or in a high-density recording process. The functions of the light-absorbing compound of the present invention have not been apparent and have now been under investigation, but they can be considered to be that the decomposition/melting of a dyestuff at the time of recording can be controlled owing to the presence of the triple bond or the double bond between carbon atoms to form precise pits, that a decomposition heat value decreases to inhibit the damage to a resin substrate of the recording medium, and that in the case of the recording medium having a reflective layer, adhesive properties between a recording layer and a metal layer which is the reflective layer can be improved. In particular, in the case that the OR group is an unsaturated hydrocarbon-oxy group having a double bond present between the second and third carbon atoms from the carbon atom adjacent to the oxygen atom bonded to the aromatic ring, the sensitivity and recording properties of the optical recording medium can be remarkably effectively improved. This effect is considered to be due to the Claisen rearrangement and elimination of the unsaturated hydrocarbon group. That is, it can be presumed that recording or playback is carried out by the utilization of a difference between values of absorbance or reflectivity before and after the Claisen rearrangement and elimination which are caused by the laser beam having a low power, thereby forming precise pits with very good sensitivity and with less damage to the resin substrate.

In the phthalocyanine compound or naphthalocyanine compound of the light-absorbing compounds of the present invention, if at least one of the OR groups is an unsaturated hydrocarbon-oxy group having a double bond between the second and third carbon atoms from the carbon atom adjacent to the oxygen atom bonded to its aromatic ring, the Claisen rearrangement and slight elimination of the unsaturated hydrocarbon group are caused by heating at about 200° C., while a naphthalocyanine or phthalocyanine skeleton is maintained. This fact has been elucidated by 1H-NMR, mass spectrum measurement, thermal analysis (thermogravimetric analysis: TG, differential thermal analysis: DTA or differential scanning thermal analysis: DSC) and the like. For example, according to change with time under heating in $^1$H-NMR, signals attributed to an allyl group bonded to an oxygen atom in the region of an allyl group ($\delta$ = 3.0–5.8 ppm) decrease, and signals which are considered to be attributed to the allyl group newly bonded to an aromatic ring in a highly magnetic region appear. In the mass spectrum, a fragment peak indicating an unsaturated hydrocarbon group portion present before heating is lessened or not observed, and this fact is considered to mean that the rearrangement reaction takes place by the heating to decrease the unsaturated hydrocarbon group portion. In TG, the observation of the slight decrease in weight is begun from a temperature of about 200° C., and in DSC, heat generation is observed at a temperature of about 200° C. These phenomenons in TG and DSC are not observed in a phthalocyanine compound or naphthalocyanine compound having a corresponding saturated hydrocarbonoxy group alone. Furthermore, with regard to the naphthalocyanine compound or phthalocyanine compound in which the Claisen rearrangement and elimination of the unsaturated hydrocarbon group have occurred, its absorbance at about 780 nm in a solution increases 2–20 times as much as before the reaction. In an optical recording medium formed by applying this compound onto a glass substrate, its reflectivity at about 780 nm decreases to ⅔ to 1/10 of that of the compound before the reaction. Therefore, a reflective light quantity of the laser beam is largely different between the pit portions and portions other than the pit portions, and in consequence, a large modulation degree of regenerative signals can be taken. The above-mentioned effects, particularly the effects based on the Claisen rearrangement are observed similarly in the other light-absorbing compounds of the present invention.

Among the light-absorbing compounds of the present invention, particularly the phthalocyanine and naphthalocyanine compounds have a sharp absorption at 650–900 nm and a high molecular extinction coefficient of 150,000 or more, and they are also excellent in long-term shelf stability and light resistance. Therefore, the phthalocyanine and naphthalocyanine compounds are suitable for recording materials of the optical recording media (optical discs, optical cards and the like) using the semiconductor laser.

Now, the preferable embodiment of the present invention will be described in detail.

In the formulae (I) to (V), a typical example of a substituent represented by OR is (a) a substituted or unsubstituted saturated hydrocarbon-oxy group having 1 to 20 carbon atoms, or (b) a substituted or unsubstituted unsaturated hydrocarbon-oxy group having 2 to 20 carbon atoms, but a substituted or unsubstituted and saturated or unsaturated hydrocarbonoxy group having 3 to 12 carbon atoms is preferable in consideration of commercial availability and solubility.

Examples of the unsubstituted saturated hydrocarbonoxy group include an n-propyloxy group, iso-butyloxy group, sec-butyloxy group, t-butyloxy group, n-pentyloxy group, iso-pentyloxy group, neo-pentyloxy group, 2-methylbutyl-3-oxy group, n-hexyloxy group, cyclo-hexyloxy group, 2-methylpentyl-4-oxy group, 2-methylpentyl-3-oxy group, 3-methylphentyl-4-oxy group, n-heptyloxy group, 2-methylhexyl-5-oxy group, 2,4-dimethylpentyl-3-oxy group, 2-methylhexyl-3-oxy group, heptyl-4-oxy group, n-octyloxy group, 2-ethylhexyl-1-oxy group, 2,5-dimethylhexyl-3-oxy group, 2,4-dimethylhexyl-3-oxy group, 2,2,4-trimethylpentyl-3-oxy group, n-nonyloxy group, 3,5-dimethylheptyl-4-oxy group, 2,6-dimethylheptyl-3-oxy group, 2,4-dimethylheptyl-3-oxy group, n-dodecyloxy group, 2,2,5,5-tetramethylhexyl-3-oxy group, 1-cyclo-pentyl-2,2-dimethylpropyl-1-oxy group and 1-cyclo-hexyl-2,2-dimethylpropyl-1-oxy group.

Examples of the substituted saturated hydrocarbonoxy group include alkoxyalkoxy groups such as a methoxyethoxy group, ethoxyethoxy group, propoxyethoxy group, butoxyethoxy group, γ-methoxypropyloxy group and γ-ethoxypropyloxy group; alkoxyalkoxyalkoxy groups such as an ethoxyethoxyethoxy group and butyloxyethoxyethoxy group; aminoalkoxy groups such as dimethylaminoethoxy group and 2-amino-2-methylhexyl-3-oxy group; aralkyloxy groups such as a benzyloxy group, phenylethyloxy group, naphthyloxy group and 3-benzyl-3-methylbutyl-2-oxy group; hydroxyalkoxy groups such as 2-hydroxyethyl-1-oxy group and 2-hydroxy-3-phenoxypropyl-1-oxy group; and acyloxyalkoxy groups such as an acetoxyethyloxy group and acetoxyethoxyethyloxy group.

Examples of the substituted or unsubstituted unsaturated hydrocarbon-oxy group having a double bond between the second and third carbon atoms from the carbon atom adjacent to the oxygen atom bonded to the aromatic ring include a 2-propenyl-1-oxy group, 1-butenyl-3-oxy group, 2-butenyl-1-oxy group, 3-butenyl-2-oxy group, 1-hydroxy-2-butenyl-4-oxy group, 2-pentenyl-1-oxy group, 3-pentenyl-2-oxy group, 1-pentenyl-3-oxy group, 1,4-pentadienyl-3-oxy group, 1-hexenyl-3-oxy group, 2-hexenyl-1-oxy group, 2-hexenyl-4-oxy group, 3-hexenyl-2-oxy group, 4-hexenyl-3-oxy group, 2,4-hexadienyl-1-oxy group, 1,4-hexadienyl-3-oxy group, 1,5-hexadienyl-3-oxy group, 1-hydroxy-2,4-hexadienyl-6-oxy group, 2,5-hexadienyl-1-oxy group, 1,3-hexadienyl-5-oxy group, 1-heptenyl-3-oxy group, 2-hepteny-4-oxy group, 3-heptenyl-5-oxy group, 1,4-heptadienyl-3-oxy group, 1,5-heptadienyl-4-oxy group, 1,5-heptadienyl-3-oxy group, 2,5-heptadienyl-4-oxy group, 1-octenyl-3-oxy group, 2-octenyl-4-oxy group, 1-nonenyl-3-oxy group, 4-dimethylamino-1-butenyl-3-oxy group, 4-methylthio-1-butenyl-3-oxy group, 1-cyclopentyl-2-methyl-2-propenyl-1-oxy group, 1-cyclohexyl-2-methyl-2-propenyl-1-oxy group, 2-methyl-2-butenyl-1-oxy group, 3-methyl-2-butenyl-1-oxy group, 2-methyl-3-butenyl-2-oxy group, 3-methyl-3-buteneyl-2-oxy group, 3-methyl-2-butenyl-1-oxy group, 2,3-dimethyl-3-butenyl-2-oxy group, 2-methyl-1-pentenyl-3-oxy group, 3-methyl-1-pentenyl-3-oxy group, 4-methyl-3-pentenyl-2-oxy group, 4-methyl-1-pentenyl-3-oxy group, 3-methyl-4-pentenyl-3-oxy group, 2-methyl-4-pentenyl-3-oxy group, 2,4-dimethyl-1-pentenyl-3-oxy group, 2,3-dimethyl-1-pentenyl-3-oxy group, 2,4-dimethyl-1,4-pentadienyl-3-oxy group, 2,4,4-trimethyl-1-pentenyl-3-oxy group, 4-methyl-4-hexenyl-3-oxy group, 2-methyl-1-hexenyl-3-oxy group, 2-methyl-4-hexenyl-3-oxy group, 3-methyl-3-hexenyl-2-oxy group, 2,5-dimethyl-5-hexenyl-4-oxy group, 2-methyl-1,5-hexadienyl-3-oxy group, 2-methyl-1,5-hexadienyl-4-oxy group, 5-methyl-1,5-hexadienyl-3-oxy group, 2,5-dimethyl-1,5-hexadienyl-3-oxy group, 2,2-dimethyl-5-hexenyl-4-oxy group, 2,3,4-trimethyl-4-hexenyl-3-oxy group, 2-methyl-1-heptenyl-3-oxy group, 5-methyl-1-heptenyl-3-oxy group, 4-methyl-4-heptenyl-3-oxy group, 2-methyl-1,5-heptadienyl-4-oxy group, 2,5-dimethyl-1-heptenyl-3-oxy group, 2,4-dimethyl-2,6-heptadienyl-1-oxy group, 2,6-dimethyl-2,5-heptadienyl-4-oxy group, 3,5-dimethyl-1,5-heptadienyl-4-oxy group, 2-methyl-4-dimethylamino-1-butenyl-3-oxy group, 2-methyl-4-methylthio-1-butenyl-3-oxy group and 3-methyl-2-pentenyl-4-in-1-oxy group.

Other examples of the substituted or unsubstituted unsaturated hydrocarbon-oxy group include an ethenyloxy group, 3-butenyl-1-oxy group, 5-hexenyl-2-oxy group, 5-hexenyl-1-oxy group, 3-hexenyl-1-oxy group, 4-hexenyl-1-oxy group, 1-octenyl-4-oxy group, 2-methyl-3-butenyl-1-oxy group, 3-methyl-3-butenyl-1-oxy group, 3-methyl-4-pentenyl-2-oxy group, 4-methyl-4-pentenyl-2-oxy group, 2-methyl-4-pentenyl-2-oxy group, 4-methyl-4-hexenyl-2-oxy group, 5-methyl-5-hexenyl-2-oxy group, 5-methyl-5-hexenyl-3-oxy group, 2-methyl-5-hexenyl-3-oxy group, 2,5-dimethyl-5-hexenyl-3-oxy group, 6-methyl-5-heptenyl-2-oxy group, 2,2-dimethyl-5-hexenyl-3-oxy group, 5-methyl-1-heptenyl-4-oxy group, 6-methyl-6-heptenyl-6-oxy group, 3,5-dimethyl-1,6-heptadienyl-4-oxy group, 2,6-dimethyl-1-noneyl-3-in-oxy group, 1-phenyl-4-methyl-1-pentynyl-3-oxy group, 4-ethyl-1-hexynyl-3-oxy group, 2,6-dimethyl-6-heptenyl-4-in-3-oxy group and 4-methyl-1-pentynyl-3-oxy group.

The particularly preferable example of the substituent represented by OR is a group which has 5 to 10 carbon atoms considering the melting point of dyes, is branched so that the steric hindrance thereof may be greater, is prone to spread in the axial direction of the aromatic ring, is capable of making an extinction coefficient per unit weight large, and is effective to improve the sensitivity of an optical recording medium. The particularly preferable examples include 2-methylpentyl-4-oxy group, 2-methylpentyl-3-oxy group, 3-methylpentyl-4-oxy group, 2-methylhexyl-5-oxy group, 2,4-dimethylpentyl-3-oxy group, 2-methylhexyl-3-oxy group, 2,5-dimethylhexyl-3-oxy group, 2,4-dimethylhexyl-3-oxy group, 2,2,4-trimethylpentyl-3-oxy group, 3,5-dimethylheptyl-4-oxy group, 2,6-dimethylheptyl-3-oxy group, 2,4-dimethylheptyl-3-oxy group, 2,2,5,5-tetramethylhexyl-3-oxy group, 1-cyclo-pentyl-2,2-dimethylpropyl-1-oxy group, 3-methyl-3-butenyl-1-oxy group, 4-methyl-1-pentenyl-3-oxy group, 2-methyl-1-pentenyl-3-oxy group, 2-methyl-4-pentenyl-3-oxy group, 2,4-dimethylpentenyl-3-oxy group, 2,4,4-trimethyl-1-pentenyl-3-oxy group, 2-methyl-1-hexenyl-3-oxy group, 2-methyl-4-hexenyl-3-oxy group, 4-methyl-4-hexenyl-3-oxy group, 2-methyl-1,5-hexadienyl-3-oxy group, 2-methyl-1,5-hexadienyl-4-oxy group, 5-methyl-1,5-hexadienyl-3-oxy group, 2,2-dimethyl-5-hexenyl-4-oxy group, 2,5-dimethyl-5-hexenyl-4-oxy group, 2,5-dimethyl-1,5-hexadienyl-3-oxy group, 2-methyl-1-heptenyl-3-oxy group, 4-methyl-4-heptenyl-3-oxy group, 5-methyl-1-heptenyl-3-oxy group, 2-methyl-1,5-heptadienyl-4-oxy group, 2,5-dimethyl-1-heptenyl-3-oxy group, 3,5-dimethyl-1,6-heptadienyl-4-oxy group, 2,5-dimethyl-5-hexenyl-3-oxy group, 3,5-dimethyl-1,5-heptadienyl-4-oxy group, 4-methyl-4-pentenyl-2-oxy group, 4-methyl-1-pentynyl-3-oxy group and 5-methyl-5-hexenyl-3-oxy group.

Examples of the divalent metal atom represented by Met in the formulae (II) to (V) include Cu, Zn, Fe, Co, Ni, Ru, Rh, Pd, Pt, Mn, Sn, Mg, Pb, Hg, Cd, Ba, Ti, Be and Ca, and examples of the trivalent one-substituted metal atom include Al—F, Al—Cl, Al—Br, Ai—I, Ga—F, Ga—Cl, Ga—Br, Ga—I, In—F, In—Cl, In—Br, In—I, Tl—F, Tl—Cl, Tl—Br, Tl—I, Al—C$_6$H$_5$, Al—C$_6$H$_4$(CH$_3$), In—C$_6$H$_5$, In—C$_6$H$_4$(CH$_3$), Mn(OH), Mn(OC$_6$H$_5$), Mn[O-Si(CH$_3$)$_3$], Fe—Cl and Ru—Cl. Examples of the tetravalent di-substituted metal atom include CrCl$_2$, SiF$_2$, SiCl$_2$, SiBr$_2$, SiI$_2$, SnF$_2$, SnCl$_2$, SnBr$_2$, ZrCl$_2$, GeF$_2$, GeCl$_2$, GeBr$_2$, GeI$_2$, TiF$_2$, TiCl$_2$, TiBr$_2$, Si(OH)$_2$, Sn(OH)$_2$, Ge(OH)$_2$, Zr(OH)$_2$, Mn(OH)$_2$, TiA$_2$, CrA$_2$, SiA$_2$, SnA$_2$, GeA$_2$, wherein A is an alkyl group, phenyl group, naphthyl group or its derivative, Si(OA')$_2$, Sn(OA')$_2$, Ge(OA')$_2$, Ti(OA')$_2$, Cr(OA')$_2$, wherein A is an alkyl group, phenyl group, naphthyl group, trialkylsilyl group, dialkylalkoxysilyl group or its derivative, Si(SA")$_2$, Sn(SA")$_2$, Ge(SA")$_2$, wherein A" is an alkyl group, phenyl group, naphthyl group or its derivative. Examples of the oxymetal group include VO, MnO and TiO. Particularly preferable examples thereof include Cu, Ni, Co, Mg, Zn, Pd, Pt, SiCl$_2$, Si(OH)$_2$,Si(OA')$_2$ and VO.

For example, a synthetic process of a phthalocyanine compound represented by the formula (V) comprises mixing 1 to 4 kinds of compounds represented by the formula (VI):

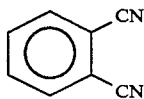

(VI)

wherein a benzene ring may have such a substituent as mentioned in the paragraph regarding the formula (V), and then thermally reacting the compounds with a metal derivative in an alcohol in the presence of, for example, 1,8-diazabicyclo[5.4.0]-7-undecene (DBU), or thermally reacting the compounds with the metal derivative in a high-boiling solvent such as chloronaphthalene, bromonaphthalene or trichlorobenzene. Another synthetic process of the compound having the formula (V) comprises reacting the compound represented by the formula (VI) with ammonia in the presence of sodium methylate as a catalyst in an alcohol to form diiminoisoindoline as an intermediate represented by the formula (VII):

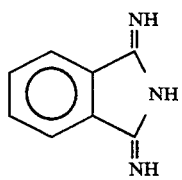

(VII)

and then carrying out the same reaction as described above.

Furthermore, the compound represented by the formula (VI) can be synthesized by a procedure described in Japanese Patent Laid-open No. 186384/1986 (U.S. Pat. No. 4,769,307) or Nouveau Journal de Chemie, Vol. 6, No. 12, pp. 653–658 (1982).

Synthetic methods of naphthalocyanine compounds represented by the formulae (III) and (IV) are described in, for example, J. Am. Chem. Soc., Vol. 106, pp. 740 (1984); J. Org. Chem., Vol. 28, pp. 3379 (1963); and J. Chem. Soc., pp. 1744 (1936).

That is, the compound represented by the formula (III) can be synthesized by mixing 1 to 4 kinds of compounds represented by the formula (VIII) or (IX):

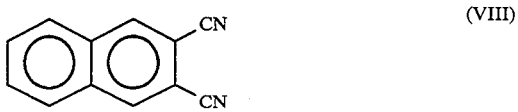

(VIII)

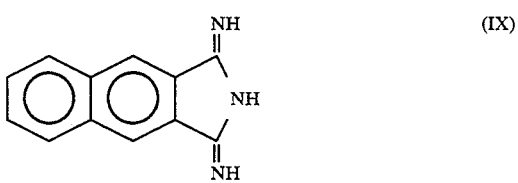

(IX)

wherein a naphthalene ring may have such a substituent as mentioned in the paragraph regarding the formula (III), and then carrying out the same process as in the above-mentioned phthalocyanine compound.

Similarly, a compound represented by the formula (IV) can be synthesized from a compound represented by the formula (X) or (XI):

(X)

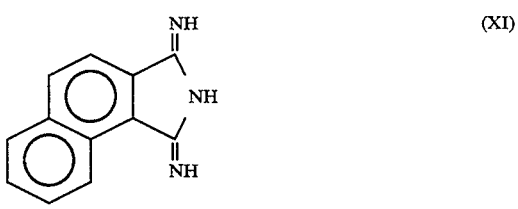

(XI)

wherein a naphthalene ring may have such a substituent as mentioned in the paragraph regarding the formula (IV).

A compound in the category of the formula (II) having a benzene skeleton and naphthalene skeleton together can also be synthesized by mixing compounds of the formulae (VI), (VIII) and (X) or (VII), (IX) and (XI), and then thermally reacting them with a metal derivative.

As a method for preparing an optical recording medium by the use of the light-absorbing compound of the present invention, there is a method comprising the application or vacuum deposition of one or two layers of 1 to 3 kinds of compounds inclusive of the light-absorbing compound of the present invention onto a transparent substrate. In the former application method, a binder resin and a light-absorbing compound of the present invention are dissolved in a solvent so that the concentration of the binder resin may be 20% by weight or less, preferably 0% and that of the light-absorbing compound may be 0.05 to 20% by weight, preferably 0.5 to 20% by weight, and the resulting solution is then applied onto the transparent substrate by the use of a spin coater. In the latter vacuum deposition method, the mixture is deposited on the substrate at 100° to 300° C. under $10^{-5}$ to $10^{-7}$ torr.

The substrate is an optically transparent resin. Examples of the substrate include an arylic resin, polyethylene resin, vinyl chloride resin, vinylidene chloride resin, polycarbonate resin, polyolefin copolymer resin, vinyl chloride copolymer resin, vinylidene chloride copolymer resin and styrene copolymer resin. Furthermore, the substrate may be subjected to a surface treatment with a thermosetting resin or ultraviolet-setting resin.

In preparing the optical recording medium (an optical disc, an optical card or the like), it is preferred that the substrate is a polyacrylate substrate or polycarbonate substrate and the application is carried out by the use of a spin coat method from the viewpoints of cost and handling of users.

In view of solvent resistance of the substrate, preferable examples of the solvent which are suitable for the spin coat include halogenated hydrocarbons (e.g., dichloromethane, chloroform, carbon tetrachloride, tetrachloroethylene and dichlorodifluoroethane), ethers (e.g., tetrahydrofuran, diethyl ether, dipropyl ether, dibutyl ether and dioxane), alcohols (e.g., methanol, ethanol and propanol), CELLOSOLVES (e.g., METHYL CELLOSOLVE and ETHYL CELLOSOLVE), hydrocarbons (e.g., hexane, cyclohexane, ethylcyclohexane, cyclooctane, dimethylcyclohexane, octane, benzene, toluene and xylene), and mixed solvents thereof.

In order to obtain the recording medium, the recording layer is covered with the substrate as described above, or the two substrates provided with the recording layers are laminated so as to face each other with the interposition of an air gap. Alternatively, a reflective layer (aluminum or gold) is formed on the recording layer, and a protective layer of a thermosetting or photo-setting resin is further laminated thereon. Usable examples of a material for the protective layer include inorganic compounds such as $Al_2O_3$, $SiO_2$, $SiO$ and $SnO_2$.

The optical recording medium obtained by the present invention can be recorded and played back by various types of laser beams. However, when the light-absorbing compound of the present invention which is incorporated into the recording layer is selected in correspondence with the wavelength of the laser beam, the optical recording medium having excellent sensitivity and recording properties can be obtained. For example, for the laser beam having a wavelength of about 780 nm, the phthalocyanine compound is usually preferable, and for the laser beam having a wavelength of about 830 nm, the naphthalocyanine compound which shifts on the side of a wavelength longer than the phthalocyanine compound is usually preferable.

Now, the present invention will be described in more detail in reference to examples, but the scope of the present invention should not be limited to these examples.

EXAMPLE 1

9.6 g (0.24 mole) of 60% sodium hydride and 150 ml of dimethylformamide were placed in a vessel equipped with a stirrer, a reflux condenser and a nitrogen feed pipe, followed by stirring under the feed of nitrogen. Afterward, 28.5 g (0.25 mole) of 2,4-dimethyl-1-pentene-3-ol were added dropwise thereto at a temperature of 20°–30° C. over 1 hour. At this temperature, the solution was stirred for 3 hours to prepare a sodium alcoholate solution.

Next, 34.6 g (0.2 mole) of 3-nitrophthalonitrile and 150 ml of dimethylformamide were placed in a vessel equipped with a stirrer and a reflux condenser, followed by dissolving. The previously prepared sodium alcoholate solution was added dropwise thereto at 0°–10° C. over 3 hours, and after completion of the dropping, the temperature of the solution was raised up to 20°–30° C. followed by stirring for 3 hours to bring the reaction to an end. After completion of the reaction, the reaction solution was poured into 3 l of water and then stirred for 30 minutes. Then, 500 ml of toluene were added thereto, and the solution was stirred for 30 minutes and then allowed to stand, thereby separating a toluene layer. After toluene was distilled off under reduced pressure, recrystallization was carried out from 600 ml of n-hexane to obtain 39.4 g (yield 82.0%) of 3-(2,4-dimethyl-1-pentenyl-3-oxy)phthalonitrile. According to purity analysis by liquid chromatography, the purity of the product was 99.2%. The results of elementary analysis were as follows:

| Elementary analysis: $C_{15}H_{16}N_2O$ | | | |
|---|---|---|---|
| | C | H | N |
| Calcd. (%) | 74.97 | 6.71 | 11.65 |
| Found (%) | 75.12 | 6.78 | 11.48 |

Next, 24.0 g (0.1 mole) of 3-(2,4-dimethyl-1-pentenyl-3-oxy)phthalonitrile, 15.2 g (0.1 mole of DBU and 25 g of n-amyl alcohol were placed in a vessel equipped with a stirrer, a reflux condenser and a nitrogen feed pipe, and the temperature of the solution was raised up to 100° C. under a nitrogen atmosphere. Next, at this temperature, 5.3 g (0.03 mole) of palladium chloride were added thereto, and reaction was then carried out at 95°–100° C. for 20 hours. After completion of the reaction, the reaction solution was cooled and then filtered to remove insolubles therefrom. The resulting filtrate was concentrated under reduced pressure to recover the solvent, and then subjected to column purification (500 g of silica gel, solvent: toluene) to obtain 16.8 g (yield 63%) of deep green crystals of a phthalocyanine palladium compound having unsaturated hydrocarbonoxy groups at the desired α-positions. According to high-speed liquid chromatography, a purity of the product was 99.0%. The results of a visible ray absorption spectrum and elementary analysis were as follows:

Visible absorption: $\lambda_{max} = 692$ nm $\epsilon_g = 2.6 \times 10^5$ $cm^2 g^{-1}$ (solvent: toluene)

| Elementary analysis: $C_{60}H_{64}N_8O_4Pd$ | | | |
|---|---|---|---|
| | C | H | N |
| Calcd. (%) | 67.50 | 6.04 | 10.50 |
| Found (%) | 67.85 | 5.86 | 10.64 |

An n-octane solution (10 g/l) of the above-mentioned phthalocyanine compound was applied onto a 120-mm-diameter, 1.2-mm-thick polycarbonate substrate with a spiral groove (pitch 1.6 μm, groove width 0.6 μm, and groove depth 0.18 μm) for CD-R by means of a spin coater to form a film thereon. Next, gold was deposited as thick as 30 nm on this film by sputtering to form a reflective layer. Successively, overcoat was given with a photo-setting polyacrylic resin, and this resin was then photo-set to form a protective layer, thereby preparing a CD-R type medium. When EFM signals were written in this medium at a linear velocity of 1.4 m/sec under a power of 6.0 mW by the use of a laser beam having a wavelength of 780 nm, an error rate was less than 0.2%, and when the prepared medium was subjected to a durability test using a carbon arc lamp at 63° C. for 200 hours, any change was not observed.

EXAMPLE 2

24.0 g (0.1 mole) of 3-(2,4-dimethyl-1-pentenyl-3-oxy)phthalonitrile, 15.2 g (0.1 mole) of DBU and 125 g of n-amyl alcohol were placed in the same vessel as in Example 1, and the temperature of the solution was raised up to 100° C. under a nitrogen atmosphere. Next, at this temperature, 3.0 g (0.03 mole) of cuprous chloride were added thereto, and reaction was then carried out at 95°–100° C. for 10 hours. After completion of the reaction, the reaction solution was cooled and then filtered to remove insolubles therefrom. The resulting filtrate was concentrated under reduced pressure to recover the solvent, and then subjected to column purification (500 g of silica gel, solvent: toluene) to obtain 19.8 g (yield 77.1%) of deep green crystals of a phthalocyanine copper compound having unsaturated hydrocarbonoxy groups at the desired α-positions. According to high-speed liquid chromatography, a purity of the product was 99.6%. The results of a visible ray absorption spectrum and elementary analysis were as follows:

Visible absorption: $\lambda_{max}=708$ nm $\epsilon_g=2.4\times10^5$ cm$^2$g$^{-1}$ (solvent: toluene)

| Elementary analysis: C$_{60}$H$_{64}$N$_8$O$_4$Cu | | | |
| --- | --- | --- | --- |
| | C | H | N |
| Calcd. (%) | 70.32 | 6.30 | 10.93 |
| Found (%) | 70.60 | 6.20 | 11.10 |

A dibutyl ether solution (10 g/l) of the above-mentioned phthalocyanine compound was applied onto a polycarbonate substrate for CD-R by means of a spin coater to form a film thereon. Next, gold was deposited on this film by sputtering. Successively, an ultraviolet-setting resin was used to form a protective layer, thereby preparing a CD-R type medium. When EFM signals were written in this medium at a linear velocity of 1.4 m/sec under a power of 6.0 mW by the use of a laser beam having a wavelength of 780 nm, an error rate was less than 0.2%, and even when playback was carried out 1,000,000 times by the use of playback light of 0.5 mW, any change was not observed. In addition, even after the medium was exposed to conditions of 80° C./85% for 1,000 hours, recording and playback could be done without any trouble.

EXAMPLE 3

24.0 g (0.1 mole) of 3-(2,4-dimethyl-1-pentenyl-3-oxy)phthalonitrile, 15.2 g (0.1 mole) of DBU and 125 g of n-amyl alcohol were placed in the same vessel as in Example 1, and the temperature of the solution was raised up to 100° C. under a nitrogen atmosphere. Next, at this temperature, 4.7 g (0.03 mole) of vanadium trichloride were added thereto, and reaction was then carried out at 95°–100° C. for 10 hours. After completion of the reaction, the reaction solution was cooled and then filtered to remove insolubles therefrom. The resulting filtrate was concentrated under reduced pressure to recover the solvent, and then subjected to column purification (500 g of silica gel, solvent: toluene) to obtain 11.6 g (yield 45.3%) of deep green crystals of a phthalocyanineoxy vanadium compound having unsaturated hydrocarbonoxy groups at the desired α-positions. According to high-speed liquid chromatography, a purity of the product was 99.0%. The results of a visible ray absorption spectrum and elementary analysis were as follows:

Visible absorption: $\lambda_{max}=733$ nm $\epsilon_g=2.6\times10^5$ cm$^2$g$^{-1}$ (solvent: toluene)

| Elementary analysis: C$_{60}$H$_{64}$N$_8$O$_5$V | | | |
| --- | --- | --- | --- |
| | C | H | N |
| Calcd. (%) | 70.09 | 6.27 | 10.90 |
| Found (%) | 70.28 | 6.34 | 10.77 |

10 g of the above-mentioned phthalocyanine compound were dissolved in 500 ml of a mixed solvent of dibutyl ether and diisopropyl ether at 3:1 (volume ratio), and the solution was applied as thick as 100 nm onto a polycarbonate optical card substrate by means of a spin coater. Successively, on the applied surface, a protective layer was formed using an ultraviolet-setting resin, thereby preparing an optical card. When this optical card was recorded by the use of a laser beam having a wavelength of 800 nm, a linear velocity of 2 m/sec and a power of 4 mW, a CN ratio was 61 dB. Furthermore, the optical card could be played back by a laser beam having a linear velocity of 2 m/sec and a power of 0.8 mW, and according to the inspection of light stability in the playback, it was possible to carry out the playback 10$^5$ times. In addition, this optical card was excellent in shelf stability.

EXAMPLE 4

24.0 g (0.1 mole) of 3-(2,4-dimethyl-1-pentenyl-3-oxy)phthalonitrile, 15.2 g (0.1 mole) of DBU and 120 g of n-amyl alcohol were placed in the same vessel as in Example 1, and the temperature of the solution was raised up to 100° C. under a nitrogen atmosphere. Next, at this temperature, 2.8 g (0.03 mole) of magnesium chloride were added thereto, and reaction was then carried out at 95°–100° C. for 15 hours. After completion of the reaction, the reaction solution was cooled and then filtered to remove insolubles therefrom. The resulting filtrate was concentrated under reduced pressure to recover the solvent, and then subjected to column purification (500 g of silica gel, a solvent of toluene:ethyl acetate=8:2 in a volume ratio) to obtain 13.8 g (yield 56.2%) of deep green crystals of a phthalocyanine magnesium compound having unsaturated hydrocarbonoxy groups at the desired α-positions. According to liquid chromatography, a purity of the product was 98.9%. The results of a visible ray absorption spectrum and elementary analysis were as follows:

Visible absorption: $\lambda_{max}=704$ nm $\epsilon_g=2.6\times10^5$ cm$^2$g$^{-1}$ (solvent: toluene)

| Elementary analysis: $C_{60}H_{64}N_8O_4Mg$ | | | |
|---|---|---|---|
| | C | H | N |
| Calcd. (%) | 73.12 | 6.55 | 11.37 |
| Found (%) | 72.86 | 6.70 | 11.31 |

An ethylcyclohexane solution (20 g/l) of the above-mentioned phthalocyanine compound was applied onto a polycarbonate substrate for CD-R by means of a spin coater in the same manner as in Example 1, and gold was deposited thereon by sputtering. Successively, an ultraviolet-setting resin was used to form a protective layer, thereby preparing a CD-R type medium. When EFM signals were written in this medium at a linear velocity of 2.8 m/sec under a power of 6.0 mW by the use of a laser beam having a wavelength of 780 nm, an error rate was less than 0.2%, and even when playback was carried out 1,000,000 times by the use of playback light of 0.5 mW, any change was not observed. In addition, even after the medium was exposed to conditions of 80° C./85% for 1,000 hours, recording and playback could be done without any trouble.

EXAMPLE 5

24.0 g (0.1 mole) of 3-(2,4-dimethyl-1-pentenyl-3-oxy)phthalonitrile, 15.2 g (0.1 mole) of DBU and 120 g of n-amyl alcohol were placed in the same vessel as in Example 1, and the temperature of the solution was raised up to 100° C. under a nitrogen atmosphere. Next, at this temperature, 4.1 g (0.03 mole) of zinc chloride were added thereto, and reaction was then carried out at 95°-100° C. for 25 hours. After completion of the reaction, the reaction solution was cooled and then filtered to remove insolubles therefrom. The resulting filtrate was concentrated under reduced pressure to recover the solvent, and then subjected to column purification (500 g of silica gel, a solvent of toluene:ethyl acetate=8:2 in a volume ratio) to obtain 16.9 g (yield 65.8%) of deep green crystals of a phthalocyanine zinc compound having unsaturated hydrocarbonoxy groups at the desired s-positions. According to liquid chromatography, a purity of the product was 99.1%. The results of a visible ray absorption spectrum and elementary analysis were as follows:

Visible absorption: $\lambda_{max}=706$ nm $\epsilon_g=2.5\times 10^5$ $cm^2g^{-1}$ (solvent: toluene)

| Elementary analysis: $C_{60}H_{64}N_8O_4Zn$ | | | |
|---|---|---|---|
| | C | H | N |
| Calcd. (%) | 70.20 | 6.28 | 10.92 |
| Found (%) | 70.45 | 6.41 | 10.78 |

A CD-R type medium was prepared by the use of the above-mentioned phthalocyanine compound in the same manner as in Example 1. When EFM signals were written in this medium at a linear velocity of 1.4 m/sec under a power of 6.0 mW by the use of a laser beam having a wavelength of 780 nm, an error rate was less than 0.2%.

EXAMPLE 6

The same procedure as in Example 1 was repeated except that 3-nitrophthalonitrile was replaced with 4-nitrophthalonitrile, to synthesize 4-(2,4-dimethyl-1-pentenyl-3-oxy)phthalonitrile, and thus, a phthalocyanine palladium compound having unsaturated hydrocarbonoxy groups at the β-positions was obtained.

The amount of the obtained 4-(2,4-dimethyl-1-pentenyl-3-oxy)phthalonitrile was 41.0 g (yield 85.3%), and according to high-speed liquid chromatography, a purity of the product was 98.9%. The results of elementary analysis were as follows:

| Elementary analysis: $C_{15}H_{16}N_2O$ | | | |
|---|---|---|---|
| | C | H | N |
| Calcd. (%) | 74.97 | 6.71 | 11.65 |
| Found (%) | 75.13 | 6.63 | 11.54 |

The amount of the obtained phthalocyanine palladium compound was 18.7 g (yield 70.2%), and according to liquid chromatography, a purity of the product was 99.0%. The results of a visible ray absorption spectrum and elementary analysis were as follows:

Visible absorption: $\lambda_{max}=688$ nm $\epsilon_g=1.5\times 10^5$ $cm^2g^{-1}$ (solvent: toluene)

| Elementary analysis: $C_{60}H_{64}N_8O_4Pd$ | | | |
|---|---|---|---|
| | C | H | N |
| Calcd. (%) | 67.50 | 6.04 | 10.50 |
| Found (%) | 67.75 | 5.94 | 10.70 |

A CD-R type medium was prepared by the use of the above-mentioned phthalocyanine compound in the same manner as in Example 1. When EFM signals were written in this medium at a linear velocity of 1.4 m/sec under a power of 6.0 mW by the use of a laser beam having a wavelength of 780 nm, an error rate was less than 0.2%.

EXAMPLES 7 to 9

The same procedure as in Examples 1 to 3 was repeated except that 28.5 g of 2,4-dimethyl-1-pentene-3-ol were replaced with 32.1 g of 4-methyl-4-heptene-3-ol, to synthesize 3-(4-methyl-4-heptenyl-3-oxy)phthalonitrile, and thus, a phthalocyanine palladium compound, phthalocyanine copper compound and phthalocyanine oxyvanadium compound having unsaturated hydrocarbonoxy groups at the α-positions were obtained.

The amount of the obtained 3-(4-methyl-4-heptenyl-3-oxy)phthalonitrile was 41.2 g (yield 81.0%), and according to high-speed liquid chromatography, a purity of the product was 99.0%. The results of elementary analysis were as follows:

| Elementary analysis: $C_{16}H_{18}N_2O$ | | | |
|---|---|---|---|
| | C | H | N |
| Calcd. (%) | 75.56 | 7.13 | 11.01 |
| Found (%) | 75.80 | 7.01 | 11.17 |

The amounts of the obtained phthalocyanine palladium compound, phthalocyanine copper compound and phthalocyanine oxyvanadium compound, their purities by high-speed liquid chromatography, and the results of visible ray absorption spectra and elementary analysis were as follows:

Phthalocyanine palladium compound (Example 7)

Amount 17.4 g (yield 62.0%), Purity 99.1% Visible absorption: $\lambda_{max}=691$ nm $\epsilon_g=2.6\times 10^5$ $cm^2g^{-1}$ (solvent: toluene)

| Elementary analysis: $C_{64}H_{72}N_8O_4Pd$ | | | |
|---|---|---|---|
| | C | H | N |
| Calcd. (%) | 68.41 | 6.46 | 9.97 |
| Found (%) | 68.56 | 6.41 | 10.16 |

Phthalocyanine copper compound (Example 8)

Amount 20.6 g (yield 76.2%), Purity 99.0% Visible absorption: $\lambda_{max}=707$ nm $\epsilon_g=2.5\times 10^5$ cm$^2$g$^{-1}$ (solvent: toluene)

| Elementary analysis: $C_{64}H_{72}N_8O_4Cu$ | | | |
|---|---|---|---|
| | C | H | N |
| Calcd. (%) | 71.12 | 6.71 | 10.37 |
| Found (%) | 71.34 | 6.59 | 10.52 |

Phthalocyanine oxyvanadium compound (Example 9)

Amount 12.0 g (yield 44.1%), Purity 98.8% Visible absorption: $\lambda_{max}=730$ nm $\epsilon_g=2.6\times 10^5$ cm$^2$g$^{-1}$ (solvent: toluene)

| Elementary analysis: $C_{60}H_{64}N_8O_5V$ | | | |
|---|---|---|---|
| | C | H | N |
| Calcd. (%) | 70.90 | 6.69 | 10.33 |
| Found (%) | 71.13 | 6.58 | 10.54 |

A dimethylcyclohexane solution (10 g/l) of each phthalocyanine compound was applied as thick as 100 nm onto a PMMA optical card substrate by means of a spin coater, and successively, on the applied surface, a protective layer was formed using an ultraviolet-setting resin, thereby preparing optical cards. These optical cards could be recorded by the use of a laser beam having a wavelength of 780 nm (800 nm only in the case of the medium in which the phthalocyanine oxyvanadium compound was used), a linear velocity of 2 m/sec and a power of 4 mW, and in this case, CN ratios were from 58 to 61 dB. Furthermore, these optical cards could be played back by a laser beam having a linear velocity of 2 m/sec and a power of 0.8 mW, and according to the inspection of light stability in the playback, it was possible to carry out the playback $10^5$ times. In addition, CD-R type media were prepared by the use of the above-mentioned phthalocyanine compounds in the same manner as in Example 1. When EFM signals were written in these media at a linear velocity of 1.4 m/sec under a power of 6.0 mW by the use of a laser beam having a wavelength of 780 nm (800 nm only in the case of the medium in which the phthalocyanine oxyvanadium compound was used), error rates were less than 0.2%.

EXAMPLE 10

The same procedure as in Example 1 was repeated except that 28.5 g of 2,4-dimethyl-1-pentene-3-ol were replaced with 28.5 g of 2-methyl-4-hexene-3-ol and 5.3 g of palladium chloride were replaced with 3.9 g of nickel chloride, to synthesize 3-(2-methyl-4-hexenyl-3-oxy)phthalonitrile, and thus, a phthalocyanine nickel compound having unsaturated hydrocarbonoxy groups at the α-positions was obtained.

The amount of the obtained 3-(2-methyl-4-hexenyl-3-oxy)phthalonitrile was 40.0 g (yield 83.2%), and according to high-speed liquid chromatography, a purity of the product was 99.1%. The results of elementary analysis were as follows:

| Elementary analysis: $C_{15}H_{16}N_2O$ | | | |
|---|---|---|---|
| | C | H | N |
| Calcd. (%) | 74.97 | 6.71 | 11.65 |
| Found (%) | 75.09 | 6.80 | 11.60 |

The amount of the obtained phthalocyanine nickel compound was 17.1 g (yield 64.1%), and according to high-speed liquid chromatography, a purity of the product was 98.8%. The results of a visible ray absorption spectrum and elementary analysis were as follows:

Visible absorption: $\lambda_{max}=700$ nm $\epsilon_g=2.0\times 10^5$ cm$^2$g$^{-1}$ (solvent: toluene)

| Elementary analysis: $C_{60}H_{64}N_8O_4Ni$ | | | |
|---|---|---|---|
| | C | H | N |
| Calcd. (%) | 70.66 | 6.33 | 10.99 |
| Found (%) | 70.78 | 6.41 | 10.76 |

A CD-R type medium was prepared by the use of the above-mentioned phthalocyanine compound in the same manner as in Example 1. When EFM signals were written in this medium at a linear velocity of 1.4 m/sec under a power of 6.0 mW by the use of a laser beam having a wavelength of 780 nm, an error rate was less than 0.2%.

EXAMPLE 11

The same procedure as in Example 1 was repeated except that 28.5 g of 2,4-dimethyl-1-pentene-3-ol were replaced with 31.6 g of 2-methyl-1,5-heptadiene-4-ol and 5.3 g of palladium chloride were replaced with 3.9 g of cobalt chloride, to synthesize 3-(2-methyl-1,5-heptadienyl-3-oxy)phthalonitrile, and thus, a phthalocyanine cobalt compound having unsaturated hydrocarbonoxy groups at the α-positions was obtained.

The amount of the obtained 3-(2-methyl-1,5-heptadienyl-3-oxy)phthalonitrile was 42.1 g (yield 83.0%), and according to high-speed liquid chromatography, a purity of the product was 98.8%. The results of elementary analysis were as follows:

| Elementary analysis: $C_{16}H_{17}N_2O$ | | | |
|---|---|---|---|
| | C | H | N |
| Calcd. (%) | 75.86 | 6.76 | 11.06 |
| Found (%) | 76.00 | 6.81 | 11.12 |

The amount of the obtained phthalocyanine cobalt compound was 13.5 g (yield 50.3%), and according to high-speed liquid chromatography, a purity of the product was 98.8%. The results of a visible ray absorption spectrum and elementary analysis were as follows:

Visible absorption: $\lambda_{max}=695$ nm $\epsilon_g=2.1\times 10^5$ cm$^2$g$^{-1}$ (solvent: toluene)

| Elementary analysis: $C_{64}H_{68}N_8O_4Co$ | | | |
|---|---|---|---|
| | C | H | N |
| Calcd. (%) | 71.69 | 6.39 | 10.45 |
| Found (%) | 71.79 | 6.54 | 10.67 |

A CD-R type medium was prepared by the use of the above-mentioned phthalocyanine compound in the same manner as in Example 1. When EFM signals were written in this medium at a linear velocity of 1.4 m/sec under a power of 6.0 mW by the use of a laser beam having a wavelength of 780 nm, an error rate was less than 0.2%.

EXAMPLES 12 to 14

The same procedure as in Example 1 was repeated except that 28.5 g of 2,4-dimethyl-1-pentene-3-ol were replaced with 35 g of 3,5-dimethyl-1,6-heptadiene-4-ol, to synthesize 3-(3,5-dimethyl-1,6-heptadienyl-4-oxy)phthalonitrile, and thus, a phthalocyanine palladium compound, phthalocyanine copper compound and phthalocyanine oxyvanadium compound having unsaturated hydrocarbonoxy groups at the α-positions were obtained.

The amount of the obtained 3-(3,5-dimethyl-1,6-heptadienyl-4-oxy)phthalonitrile was 44.7 g (yield 84.0%) and according to high-speed liquid chromatography, a purity of the product was 99.1%. The results of elementary analysis were as follows:

| Elementary analysis: $C_{17}H_{18}N_2O$ | | | |
|---|---|---|---|
| | C | H | N |
| Calcd. (%) | 76.69 | 6.77 | 10.53 |
| Found (%) | 76.52 | 6.91 | 10.38 |

The amounts of the obtained phthalocyanine palladium compound, phthalocyanine copper compound and phthalocyanine oxyvanadium compound, their purities by high-speed liquid chromatography, and the results of visible ray absorption spectra and elementary analysis were as follows:

Phthalocyanine palladium compound (Example 12)

Amount 19.0 g (yield 65.0%), Purity 99.0% Visible absorption: $\lambda_{max}=690$ nm $\epsilon_g=1.9\times 10^5$ cm$^2$g$^{-1}$ (solvent: toluene)

| Elementary analysis: $C_{69}H_{72}N_8O_4Pd$ | | | |
|---|---|---|---|
| | C | H | N |
| Calcd. (%) | 69.72 | 6.15 | 9.57 |
| Found (%) | 69.81 | 6.05 | 9.62 |

Phthalocyanine copper compound (Example 13)

Amount 21.4 g (yield 76%), Purity 99.6% Visible absorption: $\lambda_{max}=706$ nm $\epsilon_g=1.6\times 10^5$ cm$^2$g$^{-1}$ (solvent: toluene)

| Elementary analysis: $C_{68}H_{72}N_8O_4Cu$ | | | |
|---|---|---|---|
| | C | H | N |
| Calcd. (%) | 72.37 | 6.37 | 9.90 |
| Found (%) | 72.41 | 6.52 | 9.81 |

Phthalocyanine oxyvanadium compound (Example 14)

Amount 15.5 g (yield 54.8%), Purity 99.0% Visible absorption: $\lambda_{max}=733.5$ nm $\epsilon_g=1.9\times 10^5$ cm$^2$g$^{-1}$ (solvent: toluene)

| Elementary analysis: $C_{68}H_{64}N_8O_5V$ | | | |
|---|---|---|---|
| | C | H | N |
| Calcd. (%) | 72.15 | 6.37 | 9.90 |
| Found (%) | 72.28 | 6.40 | 9.78 |

A dimethylcyclohexane solution (10 g/l) of each phthalocyanine compound was applied onto a polycarbonate optical card substrate in the same manner as in Example 3, and successively, on the applied surface, a protective layer was formed to prepare optical cards. These optical cards could be recorded by the use of a laser beam having a wavelength of 780 nm (800 nm only in the case of the medium in which the phthalocyanine oxyvanadium compound was used), a linear velocity of 2 m/sec and a power of 4 mW, and in this case, CN ratios were from 58 to 61 dB. Furthermore, these optical cards could be played back by a laser beam having a linear velocity of 2 m/sec and a power of 0.8 mW, and according to the inspection of light stability in the playback, it was possible to carry out the playback $10^5$ times. In addition, CD-R type media were prepared by the use of the above-mentioned phthalocyanine compounds in the same manner as in Example 1. When EFM signals were written in these media at a linear velocity of 1.4 m/sec under a power of 6.0 mW by the use of a laser beam having a wavelength of 780 nm (800 nm only in the case of the medium in which the phthalocyanine oxyvanadium compound was used), error rates were less than 0.2%.

EXAMPLES 15 and 16

The same procedure as in Example 1 was repeated except that 28.5 g of 2,4-dimethyl-1-pentene-3-ol were replaced with 32 g of 2,5-dimethyl-5-hexene-3-ol, to synthesize 3-(2,5-dimethyl-5-hexenyl-3-oxy)phthalonitrile, and thus, a phthalocyanine palladium compound and phthalocyanine copper compound having unsaturated hydrocarbonoxy groups at the α-positions were obtained.

The amount of the obtained 3-(2,5-dimethyl-5-hexenyl-3-oxy)phthalonitrile was 43.7 g (yield 86.0%), and according to high-speed liquid chromatography, a purity of the product was 99.0%. The results of elementary analysis were as follows:

| Elementary analysis: $C_{16}H_{18}N_2O$ | | | |
|---|---|---|---|
| | C | H | N |
| Calcd. (%) | 75.56 | 7.13 | 11.01 |
| Found (%) | 75.68 | 7.11 | 11.25 |

The amounts of the obtained phthalocyanine palladium compound and phthalocyanine copper compound, their purities by high-speed liquid chromatography, and the results of visible ray absorption spectra and elementary analysis were as follows:

Phthalocyanine palladium compound (Example 15)

Amount 17.4 g (yield 62.1%), Purity 99.9% Visible absorption: $\lambda_{max}=688.5$ nm $\epsilon_g=1.9\times 10^5$ cm$^2$g$^{-1}$ (solvent: toluene)

| Elementary analysis: $C_{64}H_{72}N_8O_4Pd$ | | | |
|---|---|---|---|
| | C | H | N |
| Calcd. (%) | 68.42 | 6.41 | 9.98 |
| Found (%) | 68.19 | 6.52 | 9.63 |

Phthalocyanine copper compound (Example 16)

Amount 22.0 g (yield 81.5%), Purity 99.2% Visible absorption: $\lambda_{max}=705$ nm $\epsilon_g=2.1\times 10^5$ cm$^2$g$^{-1}$ (solvent: toluene)

| Elementary analysis: $C_{64}H_{72}N_8O_4Cu$ | | | |
|---|---|---|---|
| | C | H | N |
| Calcd. (%) | 71.14 | 6.67 | 10.38 |
| Found (%) | 71.01 | 6.62 | 10.51 |

CD-R type media were prepared by the use of the above-mentioned phthalocyanine compounds in the same manner as in Example 1. When EFM signals were written in these media at a linear velocity of 1.4 m/sec under a power of 6.0 mW by the use of a laser beam having a wavelength of 780 nm, an error rate was less than 0.2%. In addition, for these media, a light resistance test was carried out at 50° C. by the use of a xenon lamp, and as a result, they did not change even after the lapse of 200 hours.

EXAMPLE 17

The same procedure as in Example 1 was repeated except that 28.5 g of 2,4-dimethyl-1-pentene-3-ol were replaced with 29.1 g of 2,4-dimethyl-3-pentanol, to synthesize 38.7 g (yield 80%) of 3-(2,4-dimethylpentyl-3-oxy)phthalonitrile. According to high-speed liquid chromatography, a purity of the product was 99.1%. The results of elementary analysis were as follows:

| Elementary analysis: $C_{15}H_{18}N_2O$ | | | |
|---|---|---|---|
| | C | H | N |
| Calcd. (%) | 74.35 | 7.49 | 11.56 |
| Found (%) | 74.52 | 7.51 | 11.68 |

The obtained 3-(2,4-dimethylpentyl-3-oxy)phthalonitrile was mixed with 3-(4-methyl-4-heptenyl-3-oxy)phthalonitrile synthesized in Examples 7 to 9 in a molar ratio of 1:1 to obtain a phthalocyanine palladium compound having unsaturated hydrocarbonoxy groups at the α-positions.

The amounts of the obtained phthalocyanine palladium compound, its purity by high-speed liquid chromatography, and the results of a visible ray absorption spectrum and elementary analysis were as follows:

Amount 17.4 g (yield 62.1%), Purity 99.9% Visible absorption: $\lambda_{max}=691.0$ nm $\epsilon_g=2.5\times 10^5$ cm$^2$g$^{-1}$ (solvent: toluene)

| Elementary analysis: $C_{62}H_{72}N_8O_4Pd$ | | | |
|---|---|---|---|
| | C | H | N |
| Calcd. (%) | 67.72 | 6.60 | 10.19 |
| Found (%) | 67.69 | 6.55 | 10.03 |

A CD-R type medium was prepared by the use of the above-mentioned phthalocyanine compound in the same manner as in Example 1. When EFM signals were written in this medium at a linear velocity of 1.4 m/sec under a power of 6.0 mW by the use of a laser beam having a wavelength of 780 nm, an error rate was less than 0.2%.

EXAMPLE 18

5.3 g (0.03 mole) of palladium chloride were added to a mixed solution of 29.6 g (0.1 mole) of a phthalonitrile derivative represented by the formula (A):

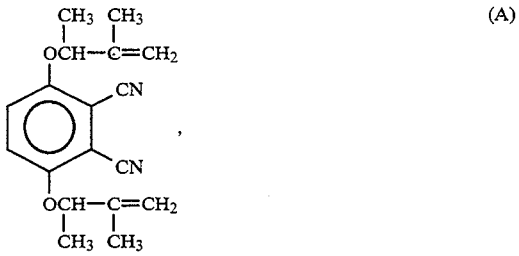

(A)

15.2 g (0.1 mole) of DBU and 125 g of n-amyl alcohol, and reaction was then carried out at 95°–100° C. for 20 hours. The reaction mixture was poured into 1,400 g of methanol to precipitate crystals. The obtained crystals were then subjected to column purification (500 g of silica gel, a solvent: toluene) to obtain a phthalocyanine palladium compound having unsaturated hydrocarbonoxy groups at eight α-positions.

The amount of the obtained phthalocyanine palladium compound, its purity by high-speed liquid chromatography, and the results of a visible ray absorption spectrum and elementary analysis were as follows:

Amount 14.6 g (yield 45.3%), Purity 99.3% Visible absorption: $\lambda_{max}=724.0$ nm $\epsilon_g=1.7\times 10^5$ cm$^2$g$^{-1}$ (solvent: toluene)

| Elementary analysis: $C_{72}H_{80}N_8O_8Pd$ | | | |
|---|---|---|---|
| | C | H | N |
| Calcd. (%) | 66.94 | 6.24 | 8.67 |
| Found (%) | 66.89 | 6.25 | 8.73 |

A dibutyl ether solution (10 g/l) of the above-mentioned phthalocyanine compound was applied as thick as 100 nm onto a polycarbonate optical card substrate, and successively, on the applied surface, a protective layer was formed using an ultraviolet-setting resin, thereby preparing an optical card. When this optical card was recorded by the use of a laser beam having a wavelength of 780 nm, a linear velocity of 2 m/sec and a power of 4 mW, a CN ratio was 60 dB. Furthermore, the optical card could be played back by a laser beam having a linear velocity of 2 m/sec and a power of 0.8 mW, and according to the inspection of light stability in the playback, it was possible to carry out the playback $10^5$ times. In addition, this optical card was excellent in shelf stability.

EXAMPLE 19

The same procedure as in Example 18 was repeated except that 5.3 g of palladium chloride were replaced with 3.0 g of cuprous chloride, to obtain a phthalocyanine copper compound having unsaturated hydrocarbonoxy groups at eight α-positions.

The amount of the obtained phthalocyanine copper compound, its purity by high-speed liquid chromatography, and the results of a visible ray absorption spectrum and elementary analysis were as follows:

Amount 17.9 g (yield 57.2%), Purity 99.4% Visible absorption: $\lambda_{max}=740.0$ nm $\epsilon_g=1.9\times 10^5$ cm$^2$g$^{-1}$ (solvent: toluene)

| Elementary analysis: $C_{72}H_{80}N_8O_8Cu$ | | | |
|---|---|---|---|
| | C | H | N |
| Calcd. (%) | 69.23 | 6.64 | 8.97 |

-continued

| Elementary analysis: $C_{72}H_{80}N_8O_8Cu$ | | | |
|---|---|---|---|
| | C | H | N |
| Found (%) | 69.18 | 6.55 | 8.93 |

A CD-R type medium was prepared by the use of the above-mentioned phthalocyanine compound in the same manner as in Example 1. When EFM signals were written in this medium at a linear velocity of 1.4 m/sec under a power of 6.0 mW by the use of a laser beam having a wavelength of 800 nm, an error rate was less than 0.2%.

EXAMPLE 20

The same procedure as in Example 18 was repeated except that 5.3 g of palladium chloride were replaced with 3.8 g of ferrous chloride, to obtain a phthalocyanine iron compound having unsaturated hydrocarbonoxy groups at eight α-positions.

The amount of the obtained phthalocyanine iron compound, its purity by high-speed liquid chromatography, and the results of a visible ray absorption spectrum and elementary analysis were as follows:

Amount 13.4 g (yield 43.2 %), Purity 99.0 % Visible absorption: $\lambda_{max}$=730.0 nm $\epsilon_g$=1.9×10$^5$ cm$^2$g$^{-1}$ (solvent: toluene)

| Elementary analysis: $C_{72}H_{80}N_8O_8Fe$ | | | |
|---|---|---|---|
| | C | H | N |
| Calcd. (%) | 69.67 | 6.50 | 9.03 |
| Found (%) | 69.79 | 6.55 | 8.95 |

A CD-R type medium was prepared by the use of the above-mentioned phthalocyanine compound in the same manner as in Example 1. When EFM signals were written in this medium at a linear velocity of 1.4 m/sec under a power of 6.0 mW by the use of a laser beam having a wavelength of 800 nm, an error rate was less than 0.2%. In addition, recording and playback could be carried out without any trouble, even after the lapse of 1,000 hours under conditions of 80° C./85%.

EXAMPLE 21

3.0 g (0.03 mole) of cuprous chloride were added to a mixed solution of 29.8 g (0.1 mole) of a phthalonitrile derivative represented by the formula (B):

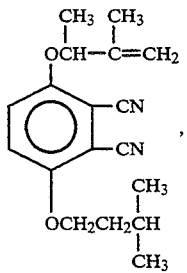

(B)

15.2 g (0.1 mole) of DBU and 125 g of n-amyl alcohol, and reaction was then carried out at 95°–100° C. for 10 hours. The reaction mixture was poured into 1,400 g of methanol to precipitate crystals. The obtained crystals were then subjected to column purification (500 g of silica gel, a solvent: toluene) to obtain a phthalocyanine copper compound having unsaturated hydrocarbonoxy groups and saturated hydrocarbonoxy grups at eight α-positions.

The amount of the obtained phthalocyanine copper compound, its purity by high-speed liquid chromatography, and the results of a visible ray absorption spectrum and elementary analysis were as follows:

Amount 17.3 g (yield 55.1), Purity 99.0% Visible absorption: $\lambda_{max}$=739.5 nm $\epsilon_g$=1.9×10$^5$ cm$^2$g$^{-1}$ (solvent: toluene)

| Elementary analysis: $C_{72}H_{88}N_8O_8Cu$ | | | |
|---|---|---|---|
| | C | H | N |
| Calcd. (%) | 68.80 | 7.06 | 8.91 |
| Found (%) | 68.69 | 7.15 | 8.83 |

A dimethylcyclohexane solution (10 g/l) of the above-mentioned phthalocyanine compound was applied as thick as 100 nm onto a polycarbonate optical card substrate by means of a spin coater, and successively, on the applied surface, a protective layer was formed using an ultraviolet-setting resin, thereby preparing an optical card. When this optical card was recorded by the use of a laser beam having a wavelength of 800 nm, a linear velocity of 2 m/sec and a power of 4 mW, a CN ratio was 59 dB. Furthermore, a CD-R type medium was prepared in the same manner as in Example 1. When EFM signals were written in this medium at a linear velocity of 1.4 m/sec under a power of 6.0 mW by the use of a laser beam having a wavelength of 800 nm, an error rate was less than 0.2%. In addition, recording and playback could be carried out without any trouble, even after the lapse of 1,000 hours under conditions of 80° C./85%.

EXAMPLE 22

3.0 g (0.03 mole) of cuprous chloride were added to a mixed solution of 32.4 g (0.1 mole) of a phthalonitrile derivative represented by the formula (C):

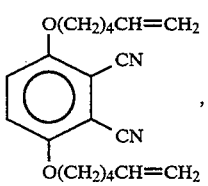

(C)

15.2 g (0.1 mole) of DBU and 125 g of n-amyl alcohol, and reaction was then carried out at 95°–100° C. for 10 hours. The reaction mixture was poured into 1,400 g of methanol to precipitate crystals. The obtained crystals were then subjected to column purification (500 g of silica gel, a solvent: toluene) to obtain a phthalocyanine copper compound having unsaturated hydrocarbonoxy groups at eight α-positions.

The amount of the obtained phthalocyanine copper compound, its purity by high-speed liquid chromatography, and the results of a visible ray absorption spectrum and elementary analysis were as follows:

Amount 24.5 g (yield 72.4%), Purity 99.2% Visible absorption: $\lambda_{max}$=736.5 nm $\epsilon_g$=1.6×10$^5$ cm$^2$g$^{-1}$ (solvent: toluene)

| Elementary analysis: $C_{80}H_{88}N_8O_8Cu$ | | | |
|---|---|---|---|
| | C | H | N |
| Calcd. (%) | 71.01 | 6.56 | 8.28 |
| Found (%) | 71.13 | 6.51 | 8.23 |

An optical card type medium was prepared using the above-mentioned phthalocyanine compound in the same manner as in Example 21. When this medium was recorded by the use of a laser beam having a wavelength of 800 nm, a linear velocity of 2 m/sec and a power of 4 mW, a CN ratio was 57 dB. Furthermore, the medium could be played back by a laser beam having a linear velocity of 2 m/sec and a power of 0.8 mW, and according to the inspection of light stability in the playback, it was possible to carry out the playback the medium $10^5$ times. In addition, this medium was also excellent in shelf stability.

EXAMPLE 23

34.0 g (0.2 mole) of silicon tetrachloride were added to a mixed solution of 31.3 g (0.1 mole) of a diiminoisoindoline derivative represented by the formula (D):

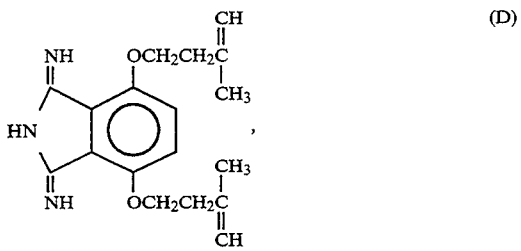

and 200 g of quinoline, and reaction was then carried out at 185°-195° C. for 5 hours. The reaction mixture was poured into 2,000 g of methanol to precipitate crystals. The obtained crystals were then subjected to column purification (500 g of silica gel, a solvent of toluene:ethyl acetate=8:2 in a volume ratio) to obtain a phthalocyanine silicon compound having unsaturated hydrocarbonoxy groups at eight α-positions (a central metal was $SiCl_2$).

The amount of the obtained phthalocyanine silicon compound, its purity by high-speed liquid chromatography, and the results of a visible ray absorption spectrum and elementary analysis were as follows:

Amount 12.5 g (yield 39.0%), Purity 99.0% Visible absorption: $\lambda_{max}=743.0$ nm $\epsilon_g=2.2\times10^5$ cm$^2$g$^{-1}$ (solvent: toluene)

| Elementary analysis: $C_{72}H_{88}N_8O_8SiCl_2$ | | | |
|---|---|---|---|
| | C | H | N |
| Calcd. (%) | 67.33 | 6.28 | 8.72 |
| Found (%) | 67.45 | 6.25 | 8.56 |

A dibutyl ether solution (10 g/l) of the above-mentioned phthalocyanine compound was applied as thick as 100 nm onto a polycarbonate optical card substrate, and successively, on the applied surface, a protective layer was formed using an ultraviolet-setting resin, thereby preparing an optical card. When this optical card was recorded by the use of a laser beam having a wavelength of 800 nm, a linear velocity of 2 m/sec and a power of 4 mW, a CN ratio was 59 dB. Furthermore, the medium could be played back by a laser beam having a linear velocity of 2 m/sec and a power of 0.8 mW, and according to the inspection of light stability in the playback, it was possible to carry out the playback $10^5$ times.

EXAMPLE 24

A mixture of 29.0 g (0.1 mole) of a naphthonitrile derivative represented by the formula (E):

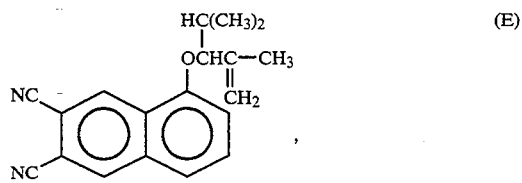

0.03 g of ammonium molybdate, 1,500 g of urea and 3.0 g (0.03 mole) of cuprous chloride was heated to carry out reaction at 200°-260° C. for 1 hour. Next, chloroform was added to the reaction mixture, and insolubles were then removed therefrom by filtration. Afterward, the resulting filtrate was concentrated and then subjected to column purification (500 g of silica gel, a solvent: toluene) to obtain a naphthalocyanine copper compound having unsaturated hydrocarbonoxy groups at α-positions.

The amount of the obtained naphthalocyanine copper compound, its purity by high-speed liquid chromatography, and the results of a visible ray absorption spectrum and elementary analysis were as follows:

Amount 3.1 g (yield 10.0%), Purity 99.0% Visible absorption: $\lambda_{max}=825.0$ nm $\epsilon_g=2.2\times10^5$ cm$^2$g$^{-1}$ (solvent: toluene)

| Elementary analysis: $C_{76}H_{72}N_8O_4Cu$ | | | |
|---|---|---|---|
| | C | H | N |
| Calcd. (%) | 74.52 | 5.92 | 9.15 |
| Found (%) | 74.69 | 5.89 | 9.30 |

A CD-R type medium was prepared using the naphthalocyanine compound in the same manner as in Example 1. When EFM signals were written in this medium at a linear velocity of 1.4 m/sec under a power of 6.0 mW by the use of a laser beam having a wavelength of 830 nm, an error rate was less than 0.2%.

EXAMPLE 25

A mixture of 34.6 g (0.1 mole) of a naphthonitrile derivative represented by the formula (F):

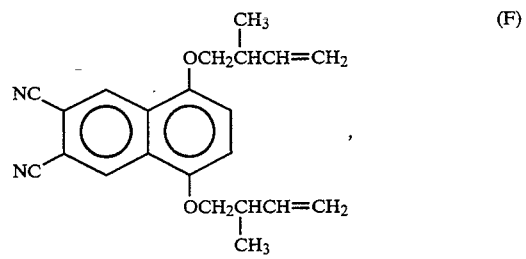

0.03 g of ammonium molybdate, 1,500 g of urea and 3.0 g (0.03 mole) of cuprous chloride was heated to carry out reaction at 200°-260° C. for 2 hours. Next, chloroform was added to the reaction mixture, and insolubles were then removed therefrom by filtration. Afterward, the resulting filtrate was concentrated and then subjected to column purification (500 g of silica gel, a solvent: toluene) to obtain a naphthalocyanine copper compound having unsaturated hydrocarbonoxy groups at eight α-positions.

The amount of the obtained naphthalocyanine copper compound, its purity by high-speed liquid chromatography, and the results of a visible ray absorption spectrum and elementary analysis were as follows:

Amount 2.9 g (yield 8.1%), Purity 99.1% Visible absorption: $\lambda_{max}=853.0$ nm $\epsilon_g=2.1\times10^5$ cm$^2$g$^{-1}$ (solvent: toluene)

| Elementary analysis: C$_{88}$H$_{88}$N$_8$O$_8$Cu | | | |
|---|---|---|---|
| | C | H | N |
| Calcd. (%) | 72.93 | 6.12 | 7.73 |
| Found (%) | 73.09 | 6.09 | 7.60 |

An optical card type medium was prepared using the above-mentioned naphthalocyanine compound in the same manner as in Example 23. When this medium was recorded by the use of a laser beam having a wavelength of 830 nm, a linear velocity of 2 m/sec and a power of 4 mW, a CN ratio was 58 dB. Furthermore, the medium could be played back by a laser beam having a linear velocity of 2 m/sec and a power of 0.8 mW, and according to the inspection of light stability in the playback, it was possible to carry out the playback 10$^5$ times. In addition, this medium was also excellent in shelf stability.

EXAMPLE 26

The same procedure as in Example 24 was repeated except that a mixture of naphthonitrile derivatives represented by the above-mentioned formulae (E) and (F) in a molar ratio of 1:1 was reacted with nickel chloride in place of cuprous chloride, to obtain a naphthalocyanine nickel compound.

The amount of the obtained naphthalocyanine nickel compound, its purity by high-speed liquid chromatography, and the results of a visible ray absorption spectrum and elementary analysis were as follows:

Amount 3.3 g (yield 9.8%), Purity 99.9% Visible absorption: $\lambda_{max}=815.0$ nm $\epsilon_g=2.2\times10^5$ cm$^2$g$^{-1}$ (solvent: toluene)

| Elementary analysis: C$_{82}$H$_{80}$N$_8$O$_6$Ni | | | |
|---|---|---|---|
| | C | H | N |
| Calcd. (%) | 73.92 | 6.05 | 8.41 |
| Found (%) | 73.77 | 6.01 | 8.25 |

A CD-R type medium was prepared using the naphthalocyanine compound in the same manner as in Example 1. When EFM signals were written in this medium at a linear velocity of 1.4 m/sec under a power of 6.0 mW by the use of a laser beam having a wavelength of 830 nm, an error rate was less than 0.2%, and also in a durability test using a carbon arc lamp at 63° C. for 200 hours, any change of the medium was not observed.

EXAMPLE 27

A mixture of 27.4 g (0.1 mole) of a naphthalonitrile derivative represented by the formula (G):

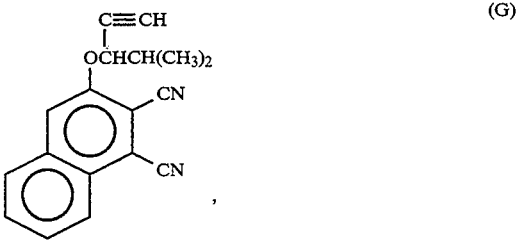

(G)

150 g of 1-chloronaphthalene and 4.7 g (0.03 mole) of vanadium trichloride was heated to carry out reaction at 230° C. for 4 hours. The reaction solution was poured into 75% aqueous methanol, and a precipitated solid was removed therefrom by filtration. Afterward, the precipitated solid was subjected to column purification (500 g of silica gel, a solvent: toluene) to obtain a 1,2-naphthalocyanine oxyvanadium compound having unsaturated hydrocarbonoxy groups at α-positions.

The amount of the obtained 1,2-naphthalocyanine oxyvanadium compound, its purity by high-speed liquid chromatography, and the results of a visible ray absorption spectrum and elementary analysis were as follows:

Amount 5.9 g (yield 20.2%), Purity 99.0% Visible absorption: $\lambda_{max}=750.0$ nm $\epsilon_g=2.0\times10^5$ cm$^2$g$^{-1}$ (solvent: toluene)

| Elementary analysis: C$_{72}$H$_{56}$N$_8$O$_4$VO | | | |
|---|---|---|---|
| | C | H | N |
| Calcd. (%) | 74.28 | 4.85 | 9.62 |
| Found (%) | 74.09 | 4.79 | 9.60 |

An optical card type medium was prepared using the above-mentioned naphthalocyanine compound in the same manner as in Example 23. When this medium was recorded by the use of a laser beam having a wavelength of 830 nm, a linear velocity of 2 m/sec and a power of 4 mW, a CN ratio was 58 dB. Furthermore, the medium could be played back by a laser beam having a linear velocity of 2 m/sec and a power of 0.8 mW, and according to the inspection of light stability in the playback, it was possible to carry out the playback 10$^5$ times. In addition, this medium was also excellent in shelf stability.

EXAMPLE 28

A mixture of 40.3 g (0.1 mole) of a naphthalonitrile derivative represented by the formula (H):

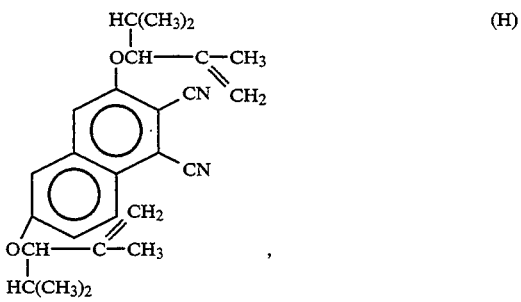

(H)

320 g of N,N-dimethylaminoethanol, 15.2 g (0.1 mole) of DBU and 3.0 g (0.03 mole) of cuprous chloride was heated to carry out reaction for 6 hours under reflux. The reaction solution was poured into 5% aqueous hydrochloric acid. The precipitated crystals were removed therefrom by filtration, and the crystals was then subjected to column purification (500 g of silica gel, a solvent: toluene) to obtain a 1,2-naphthalocyanine copper compound having unsaturated hydrocarbonoxy groups.

The amount of the obtained 1,2-naphthalocyanine copper compound, its purity by high-speed liquid chromatography, and the results of a visible ray absorption spectrum and elementary analysis were as follows:

Amount 7.9 g (yield 18.9%), Purity 99.9% Visible absorption: $\lambda_{max}=727.0$ nm $\epsilon_g=1.8\times10^5$ cm$^2$g$^{-1}$ (solvent: toluene)

| Elementary analysis: $C_{104}H_{120}N_8O_8Cu$ | | | |
| --- | --- | --- | --- |
| | C | H | N |
| Calcd. (%) | 74.62 | 7.23 | 6.70 |
| Found (%) | 74.57 | 7.18 | 6.65 |

A CD-R type medium was prepared using the naphthalocyanine compound in the same manner as in Example 1. When EFM signals were written in this medium at a linear velocity of 1.4 m/sec under a power of 6.0 mW by the use of a laser beam having a wavelength of 800 nm, an error rate was less than 0.2%.

EXAMPLE 29

The same procedure as in Example 28 was repeated except that 40.3 g (0.1 mole) of a naphthalonitrile derivative represented by the formula (J):

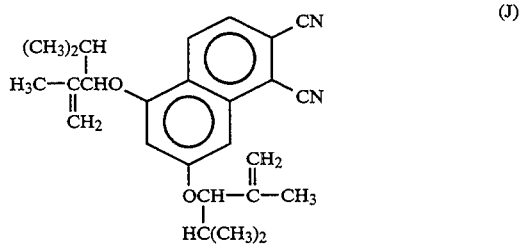

were used in place of the compound of the above-mentioned structure (H) to obtain a 1,2-naphthalocyanine copper compound having unsaturated hydrocarbonoxy groups.

The amount of the obtained 1,2-naphthalocyanine copper compound, its purity by high-speed liquid chromatography, and the results of a visible ray absorption spectrum and elementary analysis were as follows:

Amount 12.1 g (yield 28.9%), Purity 99.5% Visible absorption: $\lambda_{max}=715.0$ nm $\epsilon_g=1.6\times10^5$ cm$^2$g$^{-1}$ (solvent: toluene)

| Elementary analysis: $C_{104}H_{120}N_8O_8Cu$ | | | |
| --- | --- | --- | --- |
| | C | H | N |
| Calcd. (%) | 74.62 | 7.23 | 6.70 |
| Found (%) | 74.66 | 7.20 | 6.72 |

A CD-R type medium was prepared using the naphthalocyanine compound in the same manner as in Example 1. When EFM signals were written in this medium at a linear velocity of 1.4 m/sec under a power of 6.0 mW by the use of a laser beam having a wavelength of 800 nm, an error rate was less than 0.2%.

Comparative Tests

Optical media using the light-absorbing compounds obtained above were compared with optical media using known light-absorbing compounds in performance. As the media of the present invention, there were used media prepared by using the compounds in Examples 1, 2, 10, 11, 13, 17, 18, 24 and 27 in the same manner as in Example 1, and for comparison, there were used media prepared by using the undermentioned three known alkoxyphthalocyanines or alkoxynaphthalocyanines in the same manner as in Example 1.

Comparative Example 1

A compound having the following structure exemplified in Japanese Patent Application Laid-open No. 62878/1991 (U.S. Pat. No. 5,124,067):

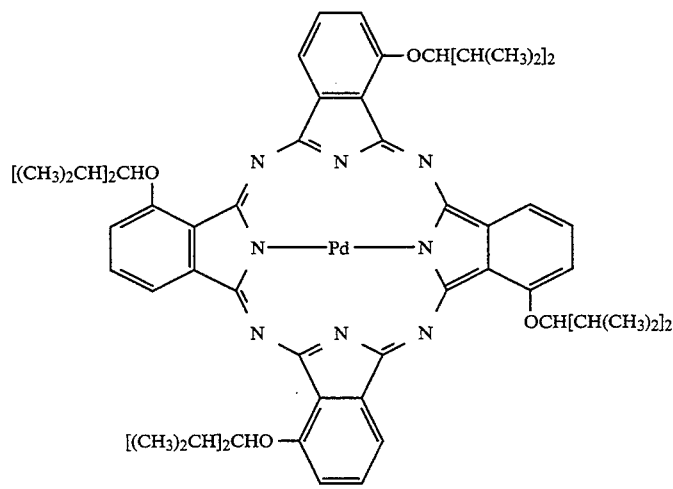

Comparative Example 2

A compound having the following structure exemplified in Japanese Patent Application Laid-open No. 296885/1990:

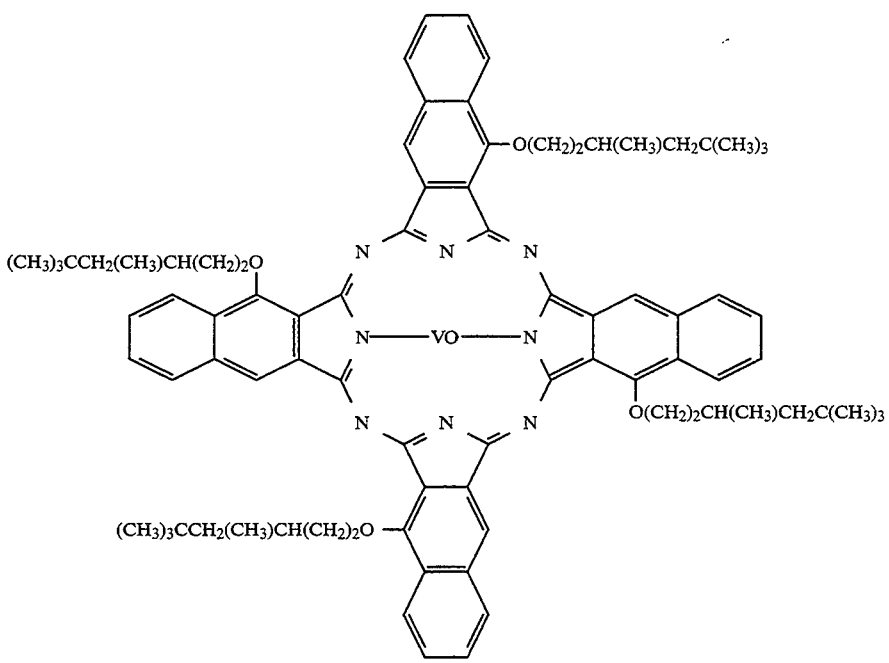

Comparative Example 3

A compound having the following structure exemplified in Japanese Patent Application Laid-open No. 43269/1990 (U.S. Pat. No. 4,960,538):

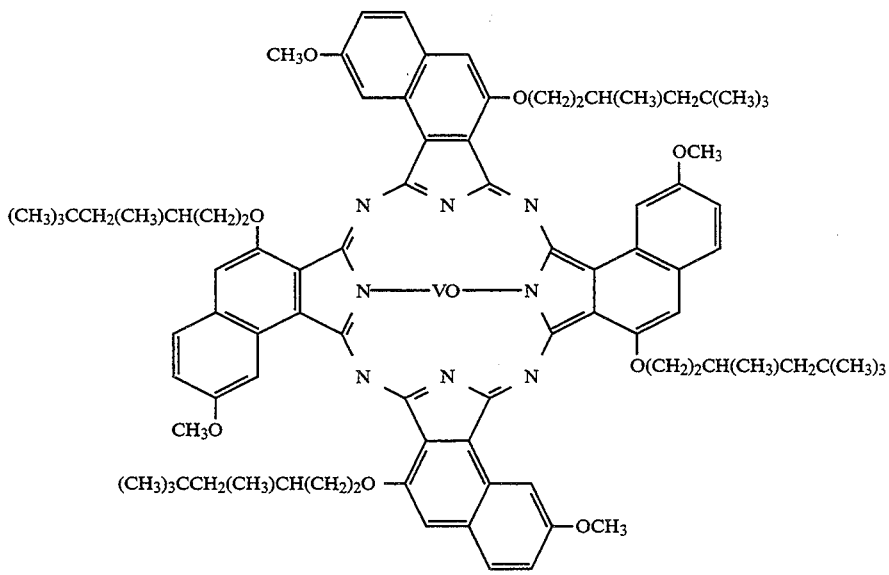

Recording and playback were carried out by the use of a proper laser beam having a wavelength corresponding to an absorption wavelength of each light-absorbing compound. In the concrete, for the media using the phthalocyanine compounds, the laser beam having a wavelength of 780 nm was used, and for the media using the naphthalocyanine compounds on the side of the wavelength longer than the phthalocyanine compounds, the laser beam having a wavelength of 830 nm was used. Recording was made in the following three manners:

usual recording: Information of 63 minutes was recorded at a linear velocity of 1.4 m/sec (one-fold velocity).

High-speed recording: Information of 63 minutes was recorded at a linear velocity of 5.6 m/sec (four-fold velocity).

High-density recording: Information of 74 minutes was recorded at a linear velocity of 1.2 m/sec.

In this connection, only at the time of the usual recording, two laser powers of 6.0 mW and 3.6 mW were used, and at the other recording operations, 6.0 mW was used.

Furthermore, recording sensitivity (C/N ratio), jitter and deviation were measured by the use of a CD decoder (trade name DR3552, made by KenWood Co., Ltd.), an LJM-1851 jitter meter (made by Leader Electronics Co., Ltd.) and a TIA-175 time interval analyzer (made by ADC Co., Ltd.), respectively. The evaluation results of these items are set forth in Table 1. The evaluation grading of each item was as follows:

Sensitivity (C/N ratio)
  A: ≧55 dB
  B: <55 dB
Jitter
  A: 3T pit jitter and 3T land jitter<35 ns
  B: 3T pit jitter and 3T land jitter≧35 ns
Deviation
  A: −50 ns<3T and 11T deviation<50 ns
  B: 3T and 11T deviation≧50 ns or 3T and 11T deviation≦−50 ns

TABLE 1

| Medium | Recording Power (nW) | Usual Recoding C/N Ratio | Jitter | Deviation |
|---|---|---|---|---|
| *Phthalocyanine Series* | | | | |
| Medium in Example 1 | 6.0 | A | A | A |
| | 3.6 | A | A | A |
| Medium in Example 2 | 6.0 | A | A | A |
| | 3.6 | A | A | B |
| Medium in Example 10 | 6.0 | A | A | A |
| | 3.6 | A | A | B |
| Medium in Example 11 | 6.0 | A | A | A |
| | 3.6 | A | A | B |
| Medium in Example 13 | 6.0 | A | A | A |
| | 3.6 | A | B | B |
| Medium in Example 17 | 6.0 | A | A | A |
| | 3.6 | A | A | B |
| Medium in Example 18 | 6.0 | A | A | A |
| | 3.6 | A | A | B |
| Medium in Comp. Ex. 1 | 6.0 | A | A | A |
| | 3.6 | — | — | — |
| *Naphthalocyanine Series* | | | | |
| Medium in Example 24 | 6.0 | A | A | A |
| | 3.6 | A | A | B |
| Medium in Example 27 | 6.0 | A | A | A |
| | 3.6 | A | B | B |
| Medium in Comp. Ex. 2 | 6.0 | A | A | B |
| | 3.6 | B | B | B |
| Medium in Comp. Ex. 3 | 6.0 | A | A | B |
| | 3.6 | B | B | B |

| Medium | Recording Power (nW) | High-speed Recoding C/N Ratio | Jitter | Deviation |
|---|---|---|---|---|
| *Phthalocyanine Series* | | | | |
| Medium in Example 1 | 6.0 | A | A | A |
| Medium in Example 2 | 6.0 | A | A | A |
| Medium in Example 10 | 6.0 | A | A | A |
| Medium in Example 11 | 6.0 | A | A | A |
| Medium in Example 13 | 6.0 | A | A | A |
| Medium in Example 17 | 6.0 | A | A | A |
| Medium in Example 18 | 6.0 | A | A | A |
| Medium in Comp. Ex. 1 | 6.0 | A | B | B |
| *Naphthalocyanine Series* | | | | |
| Medium in Example 24 | 6.0 | A | A | A |
| Medium in Example 27 | 6.0 | A | A | B |
| Medium in Comp. Ex. 2 | 6.0 | B | B | B |
| Medium in Comp. Ex. 3 | 6.0 | B | B | B |

| Medium | Recording Power (nW) | High-desnity Recoding C/N Ratio | Jitter | Deviation |
|---|---|---|---|---|
| *Phthalocyanine Series* | | | | |
| Medium in Example 1 | 6.0 | A | A | A |
| Medium in Example 2 | 6.0 | A | A | A |
| Medium in Example 10 | 6.0 | A | A | A |
| Medium in Example 11 | 6.0 | A | A | A |
| Medium in Example 13 | 6.0 | A | A | B |
| Medium in Example 17 | 6.0 | A | A | A |
| Medium in Example 18 | 6.0 | A | A | A |
| Medium in Comp. Ex. 1 | 6.0 | B | B | B |
| *Naphthalocyanine Series* | | | | |
| Medium in Example 24 | 6.0 | A | A | B |
| Medium in Example 27 | 6.0 | A | A | B |
| Medium in Comp. Ex. 2 | 6.0 | B | B | B |
| Medium in Comp. Ex. 3 | 6.0 | B | B | B |

As is apparent from Table 1, with regard to the optical recording media using the light-absorbing compounds of the present invention, particularly compounds in which a substituent OR bonded to an aromatic ring is an unsaturated hydrocarbonoxy group having a double bond between the second and third carbon atoms by count from a carbon atom adjacent to an oxygen atom bonded to the aromatic ring, good sensitivity and recording properties could be obtained in the usual recording under a laser power of 6.0 mW and a low laser power of 3.6 mW, the high-speed recording and the high-density recording. On the contrary, with regard to the optical recording media using the known compounds in Comparative Examples 1 to 3, recording properties were poor in the usual recording under the low laser power, the high-speed recording and the high-density recording, though good sensitivity and recording properties could be obtained in the usual recording under a laser power of 6.0 mW or more.

What is claimed is:

1. A light-absorbing compound represented by the formula (II):

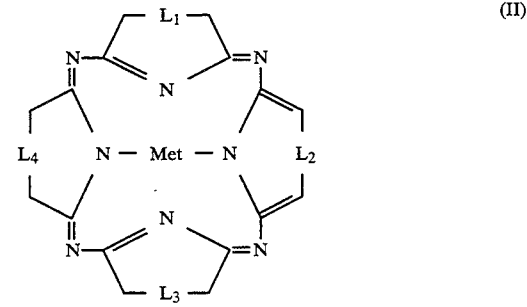

wherein each of $L_1$, $L_2$, $L_3$ and $L_4$ is a benzene ring or naphthalene ring having 0 to 2 independent OR groups, and at least one of $L_1$, $L_2$, $L_3$ and $L_4$ has one or two OR groups, wherein OR is (a) a substituted or unsubstituted saturated alkoxy group having 1 to 20 carbon atoms, or (b) a substituted or unsubstituted unsaturated alkoxy group having 2 to 20 carbon atoms, but wherein at least one of all the OR substituents present on $L_1$, $L_2$, $L_3$ and $L_4$ is a substituted or unsubstituted unsaturated alkoxy group; Met is two hydrogen atoms, a divalent metal atom, a trivalent mono-substituted metal atom, a tetravalent di-substituted metal atom or an oxymetal group.

2. The light-absorbing compound according to claim 1, wherein in the formula (II), each OR substituent present on $L_1$, $L_2$, $L_3$ and $L_4$ is a branched saturated or unsaturated alkoxy group.

3. The light-absorbing compound according to claim 1, wherein in the formula (II), at least one of the OR substituents present on $L_1$, $L_2$, $L_3$ and $L_4$ is a substituted or unsubstituted unsaturated alkoxy group and has one or more double bonds, and at least one double bond is present between the second and third carbon atoms from the carbon atom adjacent to the oxygen atom bonded to the aromatic ring.

4. The light-absorbing compound according to claim 1, which is a naphthalocyanine compound represented by the formula (III):

or (b) a substituted or unsubstituted unsaturated hydrocarbon group having 2 to 20 carbon atoms, but at least one of $R^1$, $R^2$, $R^3$ and $R^4$ is an unsaturated hydrocarbon group; each of k, l, m and n is the number of OR and it is 0 or 1; and Met is two hydrogen atoms, a divalent metal atom, a trivalent mono-substituted metal atom, a tetravalent di-substituted metal atom or an oxymetal group.

5. The light-absorbing compound according to claim 4, wherein in the formula (III), each of $R^1$, $R^2$, $R^3$, $R^4$, $R^5$, $R^6$, $R^7$ and $R^8$ is a branched saturated or unsaturated hydrocarbon group, and substituting positions of $OR^1$, $OR^2$, $OR^3$ and $OR^4$ are $\alpha$-positions of 1 or 6, 7 or 12, 13 or 18 and 19 or 24, respectively.

6. The light-absorbing compound according to claim 4, wherein in the formula (III), at least one of $R^1$, $R^2$, $R^3$ and $R^4$ has one or more double bonds, and at least one double bond is present between the second and third carbon atoms from the carbon atom adjacent to the oxygen atom bonded to the naphthalene ring.

7. The light-absorbing compound according to claim

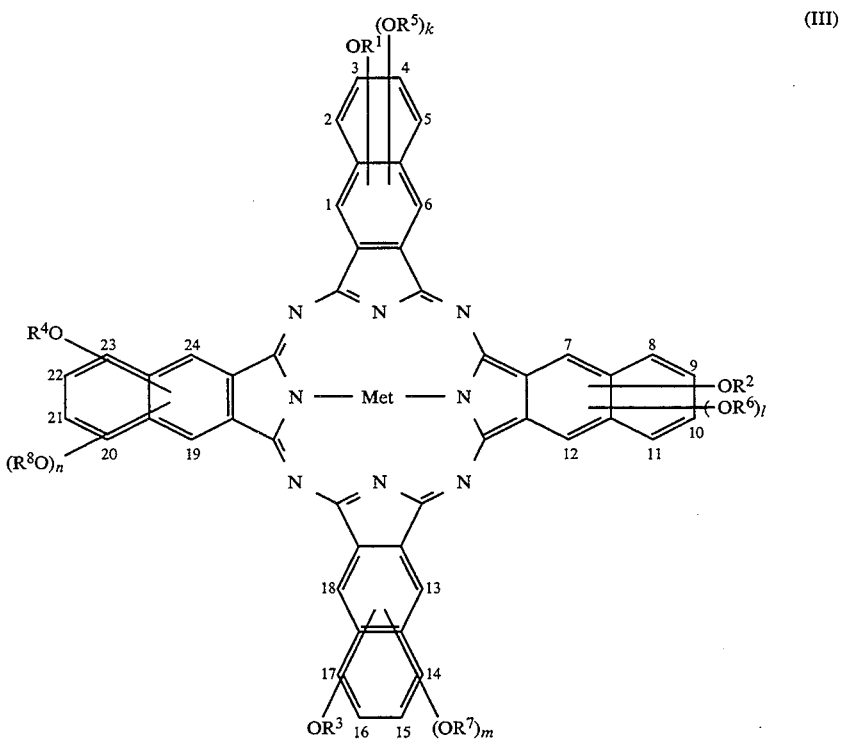

wherein each of $R^1$, $R^2$, $R^3$, $R^4$, $R^5$, $R^6$, $R^7$ and $R^8$ is independently (a) a substituted or unsubstituted saturated hydrocarbon group having 1 to 20 carbon-atoms, 1 which is a naphthalocyanine compound represented by the formula (IV):

(IV)

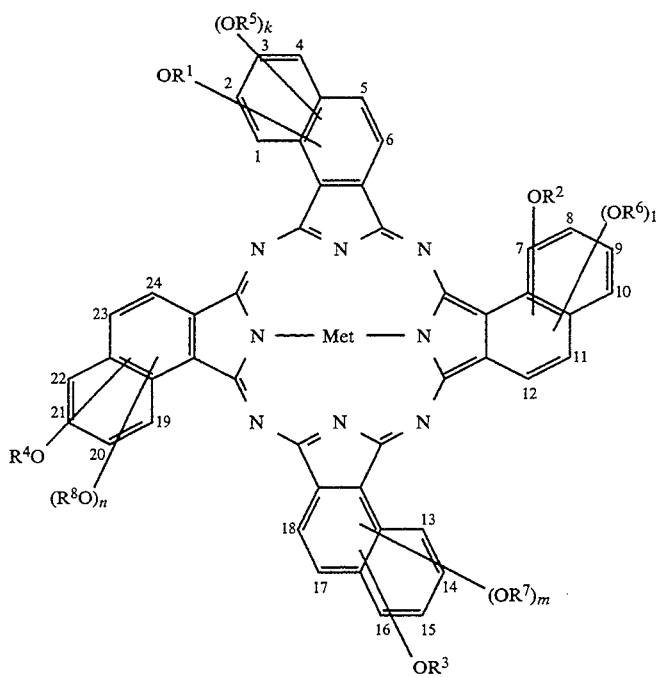

wherein each of $R^1$, $R^2$, $R^3$, $R^4$, $R^5$, $R^6$, $R^7$ and $R^8$ is independently (a) a substituted or unsubstituted saturated hydrocarbon group having 1 to 20 carbon atoms, or (b) a substituted or unsubstituted unsaturated hydrocarbon group having 2 to 20 carbon atoms, but at least one of $R^1$, $R^2$, $R^3$ and $R^4$ is an unsaturated hydrocarbon group; each of k, l, m and n is the number of OR and it is 0 or 1; and Met is two hydrogen atoms, a divalent metal atom, a trivalent mono-substituted metal atom, a tetravalent di-substituted metal atom or an oxymetal group.

8. The light-absorbing compound according to claim 7 wherein in the formula (IV), each of $R^1$, $R^2$, $R^3$, $R^4$, $R^5$, $R^6$, $R^7$ and $R^8$ is a branched saturated or unsaturated hydrocarbon group, and substituting positions of $OR^1$, $OR^2$, $OR^3$ and $OR^4$ are α-positions of 6, 12, 18 and 24, respectively.

9. The light-absorbing compound according to claim 7 wherein in the formula (IV), at least one of $R^1$, $R^2$, $R^3$ and $R^4$ has one or more double bonds, and at least one double bond is present between the second and third carbon atoms from the carbon atom adjacent to the oxygen atom bonded to the naphthalene ring.

10. The light-absorbing compound according to claim 1 which is a phthalocyanine compound represented by the formula (V):

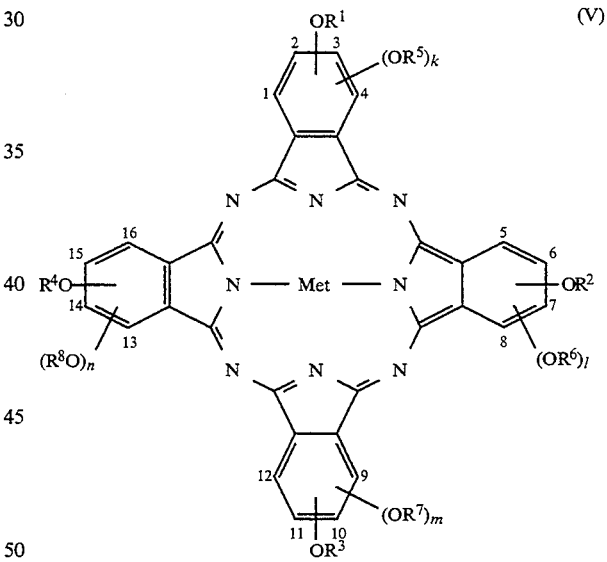

wherein each of $R^1$, $R^2$, $R^3$, $R^4$, $R^5$, $R^6$, $R^7$ and $R^8$ is independently (a) a substituted or unsubstituted saturated hydrocarbon group having 1 to 20 carbon atoms, or (b) a substituted or unsubstituted unsaturated hydrocarbon group having 2 to 20 carbon atoms, but at least one of $R^1$, $R^2$, $R^3$ and $R^4$ is an unsaturated hydrocarbon group; each of k, l, m, and n is the number of OR and it is 0 or 1; and Met is two hydrogen atoms, a divalent metal atom, trivalent mono-substituted metal atom, tetravalent di-substituted metal atom or oxymetal atom.

11. The light-absorbing compound according to claim 10 wherein in the formula (V), each of $R^1$, $R^2$, $R^3$, $R^4$, $R^5$, $R^6$, $R^7$ and $R^8$ is a branched saturated or unsaturated hydrocarbon group.

12. The light-absorbing compound according to claim 10 wherein in the formula (V), at least one of $R^1$, $R^2$, $R^3$ and $R^4$ has one or more double bonds, and at least one double bond is present between the second and third carbon atoms from the carbon atom adjacent to the oxygen atom bonded to the benzene ring.

13. The light-absorbing compound according to claim 10 wherein in the formula (V), substituting positions of $OR^1$, $OR^2$, $OR^3$, $OR^4$, $OR^5$, $OR^6$, $OR^7$ and $OR^8$ are α-positions of 1, 4, 5, 8, 9, 12, 13 and 16, respectively.

14. The light-absorbing compound according to claim 10 wherein in the formula (V), each of $R^1$, $R^2$, $R^3$ and $R^4$ is an unsaturated hydrocarbon group and has one or more double bonds, and at least one double bond is present between the second and third carbon atoms from the carbon atom adjacent to the oxygen atom bonded to the benzene ring, and each of k, l, m and n is 0.

15. The light-absorbing compound according to claim 10 wherein in the formula (V), each of $R^1$, $R^2$, $R^3$ and $R^4$ is the unsaturated hydrocarbon group having a double bond, and substituting positions of $OR^1$, $OR^2$, $OR^3$ and $OR^4$ are 1- or 4-position, 5- or 8-position, 9- or 12-position, and 13- or 16-position, respectively, and each of k, l, m and n is 0.

16. An optical recording medium in which a light-absorbing compound described in any one of claims 1 to 15 is contained in a recording layer.

17. The light-absorbing compound as claimed in any one of claims 1, 2 or 3, wherein said substituted saturated alkoxy group and substituted unsaturated alkoxy group are substituted with a substituent selected from the group consisting of alkyloxy, aryloxy, acyl, hydroxyl, amino, alkylthio, arylthio and aryl groups.

18. The light-absorbing compound as claimed in claim 1, wherein said substituted saturated alkoxy group is selected from the group consisting of a methoxyethoxy group, ethoxyethoxy group, propoxyethoxy group, butoxyethoxy group, γ-methoxypropyloxy group, γ-ethoxypropyloxy group, ethoxyethoxyethoxy group, butyloxyethoxyethoxy group, dimethylaminoethoxy group, 2-amino-2-methylhexyl-3-oxy group, benzyloxy group, phenylethyloxy group, naphthyloxy group, 3-benzyl-3-methylbutyl-2-oxy group, 2-hydroxyethyl-1-oxy group, 2-hydroxy-3-phenoxypropyl-1-oxy group, acetoxyethyloxy group and acetoxyethoxyethyloxy group.

19. The light-absorbing compound as claimed in claim 3, wherein said substituted or unsubstituted unsaturated alkoxy group having at least one double bond between the second and third carbon atoms from the carbon atom adjacent to the oxygen atom bonded to the aromatic ring is selected from the group consisting of a 2-propenyl-1-oxy group, 1-butenyl-3-oxy group, 2-butenyl-1-oxy group, 3-butenyl-2-oxy group, 1-hydroxy-2-butenyl-4-oxy group, 2-pentenyl-1-oxy group, 3-pentenyl-2-oxy group, 1-pentenyl-3-oxy group, 1,4-pentadienyl-3-oxy group, 1-hexenyl-3-oxy group, 2-hexenyl-1-oxy group, 2-hexenyl-4-oxy group, 3-hexenyl-2-oxy group, 4-hexenyl-3-oxy group, 2,4-hexadienyl-1-oxy group, 1,4-hexadienyl-3-oxy group, 1,5-hexadienyl-3-oxy group, 1-hydroxy-2,4-hexadienyl-6-oxy group, 2,5-hexadienyl-1-oxy group, 1,3-hexadienyl-5-oxy group, 1-heptenyl-3-oxy group, 2-heptenyl-4-oxy group, 3-heptenyl-5-oxy group, 1,4-heptadienyl-3-oxy group, 1,5-heptadienyl-4-oxy group, 1,5-heptadienyl-3-oxy group, 2,5-heptadienyl-4-oxy group, 1-octenyl-3-oxy group, 2-octenyl-4-oxy group, 1-nonenyl-3-oxy group, 4-dimethylamino-1-butenyl-3-oxy group, 4-methylthio-1-butenyl-3-oxy group, 1-cyclopentyl-2-methyl-2-propenyl-1-oxy group, 1-cyclohexyl-2methyl-2-propenyl-1-oxy group, 2-methyl-2-butenyl-1-oxy group, 3-methyl-2-butenyl-1-oxy group, 2-methyl-3-butenyl-2-oxy group, 3-methyl-3-buteneyl-2-oxy group, 3-methyl-2-butenyl-1-oxy group, 2,3-dimethyl-3-butenyl-2-oxy group, 2-methyl-1-pentenyl-3-oxy group, 3-methyl-1-pentenyl-3-oxy group, 4-methyl-3-pentenyl-2-oxy group, 4-methyl-1-pentenyl-3-oxy group, 3-methyl-4-pentenyl-3-oxy group, 2-methyl-4-pentenyl-3-oxy group, 2,4-dimethyl-1-pentenyl-3-oxy group, 2,3-dimethyl-1-pentenyl-3-oxy group, 2,4-dimethyl-1,4-pentadienyl-3-oxy group, 2,4,4-trimethyl-1-pentenyl-3-oxy group, 4-methyl-4-hexenyl-3-oxy group, 2-methyl-1-hexenyl-3-oxy group, 2-methyl-4-hexenyl-3-oxy group, 3-methyl-3-hexenyl-2-oxy group, 2,5-dimethyl-5-hexenyl-4-oxy group, 2-methyl-1,5-hexadienyl-3-oxy group, 2-methyl-1,5-hexadienyl-4-oxy group, 5-methyl-1,5-hexadienyl-3-oxy group, 2,5-dimethyl 1,5-hexadienyl-3-oxy group, 2,2-dimethyl-5-hexenyl-4-oxy group, 2,3,4-trimethyl-4-hexenyl-3-oxy group, 2-methyl-1-heptenyl-3-oxy group, 5-methyl-1-heptenyl-3-oxy group, 4-methyl-4-heptenyl-3-oxy group, 2-methyl-1,5-heptadienyl-4-oxy group, 2,5-dimethyl-1-heptenyl-3-oxy group, 2,4-dimethyl-2,6-heptadienyl-1-oxy group, 2,6-dimethyl-2,5-heptadienyl-4-oxy group, 3,5-dimethyl-1,5-heptadienyl-4-oxy group, 2-methyl-4-dimethylamino-1-butenyl-3-oxy group, 2-methyl-4-methylthio-1-butenyl-3-oxy group and 3-methyl-2-pentenyl-4-in-1-oxy group.

20. The light-absorbing compound as claimed in claim 1, wherein said OR groups have from 5 to 10 carbon atoms.

21. The light-absorbing compound as claimed in any one of claims 4, 7 or 10, wherein said substituted hydrocarbon group and substituted unsaturated hydrocarbon group are substituted with substituents selected from the group consisting of alkyloxy, aryloxy, acyl, hydroxyl, amino, alkylthio, arylthio and aryl groups.

22. The light-absorbing compound according to any one of claims 4, 7 or 10, wherein each of $R^1$–$R^8$ has, independently, from 5 to 10 carbon atoms.

* * * * *